United States Patent
Xu et al.

(10) Patent No.: US 12,389,318 B2
(45) Date of Patent: Aug. 12, 2025

(54) SECONDARY CELL DORMANCY INDICATION AND APPLICATION DELAY

(71) Applicant: QUALCOMM Incorporated, San Diego, CA (US)

(72) Inventors: Huilin Xu, Temecula, CA (US); Wanshi Chen, San Diego, CA (US); Peter Pui Lok Ang, San Diego, CA (US); Peter Gaal, San Diego, CA (US); Wooseok Nam, San Diego, CA (US); Yi Huang, San Diego, CA (US); Peng Cheng, Beijing (CN); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 17/766,514

(22) PCT Filed: Nov. 4, 2019

(86) PCT No.: PCT/CN2019/115307
§ 371 (c)(1),
(2) Date: Apr. 4, 2022

(87) PCT Pub. No.: WO2021/087657
PCT Pub. Date: May 14, 2021

(65) Prior Publication Data
US 2023/0171688 A1   Jun. 1, 2023

(51) Int. Cl.
*H04W 52/02* (2009.01)
*H04W 76/28* (2018.01)

(52) U.S. Cl.
CPC ... *H04W 52/0206* (2013.01); *H04W 52/0229* (2013.01); *H04W 76/28* (2018.02)

(58) Field of Classification Search
CPC ......... H04W 52/0206; H04W 52/0229; H04W 76/28
See application file for complete search history.

(56) References Cited

U.S. PATENT DOCUMENTS

| 2015/0215929 A1 | 7/2015 | Damnjanovic et al. |
| 2016/0119969 A1 | 4/2016 | Vajapeyam et al. |

(Continued)

FOREIGN PATENT DOCUMENTS

| EP | 2621242 A1 | 7/2013 |
| TW | 201909675 A | 3/2019 |

(Continued)

OTHER PUBLICATIONS

CATT: "Discussion on SCell Dormancy", 3GPP TSG RAN Meeting #85, RP-192148, 3rd Generation Partnership Project (3GPP), Mobile Competence Centre, 650, Route Des Lucioles, F-06921, Sophia-Antipolis Cedex, France, vol. TSG RAN, No. Newport Beach, CA, USA, Sep. 16, 2019-Sep. 20, 2019, Sep. 9, 2019, pp. 1-3, XP051782665.

(Continued)

*Primary Examiner* — Wayne H Cai
(74) *Attorney, Agent, or Firm* — QUALCOMM IP DEPT.; James Hunt Yancey, Jr.

(57) ABSTRACT

Aspects of the disclosure relate to wireless communications utilizing dormancy indications for secondary cells (SCells) and determining application delay times based on the dormancy indications.

35 Claims, 14 Drawing Sheets

(56) References Cited

U.S. PATENT DOCUMENTS

| | | | |
|---|---|---|---|
| 2019/0124558 A1 | 4/2019 | Ang et al. | |
| 2019/0200413 A1 | 6/2019 | Hong | |
| 2021/0029772 A1* | 1/2021 | Islam | H04L 1/1896 |
| 2021/0227409 A1* | 7/2021 | Siomina | H04B 7/0617 |

FOREIGN PATENT DOCUMENTS

| | | |
|---|---|---|
| WO | 2016064534 | 4/2016 |
| WO | 2019182287 A1 | 9/2019 |

OTHER PUBLICATIONS

Futurewei: "On Efficient and Low Latency Low Power Serving Cell Operations", 3GPP TSG RAN WG1 Meeting #98bis, R1-1910918, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 18, 2019, Oct. 4, 2019, 9 Pages, XP051789698, pp. 1-9.

Qualcomm Incorporated, et al., "Discussion on Fast SCell Activation based on RAN1/RAN4 reply LS", 3GPP TSG RAN WG2 Meeting #107b, R2-1912195, Chongqing, China, Sep. 14-18, 2019 Sep. 18, 2019 (Sep. 18, 2019), pp. 3-5, pp. 1-15.

Supplementary Partial European Search Report—EP19951585—Search Authority—The Hague—Jul. 13, 2023.

China Academy of Telecommunications Technology (CATT): "Rel-16 UE Power Saving", 3GPP TSG RAN Meeting #85, RP-192250, 3rd Generation Partnership Project, Mobile Competence Centre, 650, Route Des Lucioles, F-06921 Sophia-Antipolis Cedex, France, vol. Newport Beach, USA, Sep. 16-20, 2019, XP051779470, pp. 1-7.

Ericsson: "Summary #3 of Efficient and Low Latency Serving Cell Configuration/activation/setup", 3GPP TSG RAN WG1 Meeting #98 bis, R1-1911594, 3rd Generation Partnership Project, Mobile Competence Centre, 650, Route Des Lucioles, F-06921 Sophia-Antipolis Cedex, France, vol. Chongqing, China, Oct. 14-18, 2019, Retrieved on Oct. 28, 2019, XP051798849, 20 Pages.

Supplementary European Search Report—EP19951585—Search Authority—The Hague—Nov. 13, 2023.

Huawei, et al., "Discussion on Low Latency SCell Activation and Efficient SCell Management", 3GPP TSG RAN WG1 Meeting #98bis, R1-1910039, Chongqing, China, Oct. 14-20, 2019, 19 Pages, sections 1-6, sections 1-5 and appendix A-F.

Mediatek Inc: "Efficient and Low Latency SCell Data Transmission for NR CA", 3GPP TSG RAN WG1 Meeting RAN1 #98-Bis, R1-1911436_Efficient and Low Latency SCell Data Transmission for NR CA_RevFinal, 3rd Generation Partnership Project, Mobile Competence Centre, 650, Route Des Lucioles, F-06921 SOP, vol. RAN WG1, No. Chongqing, China, Oct. 14, 2019-Oct. 20, 2019, Oct. 22, 2019, XP051798702, 19 Pages, Item 1, Page Eigth, Figures 1, 3-8.

International Search Report and Written Opinion—PCT/CN2019/115307—ISA/EPO—Jul. 24, 2020.

Qualcomm Incorporated: "Fast SCell Activation and SCell Dormancy", 3GPP TSG-RAN WG1 #98bis, 3GPP Draft, R1-1911139, Fast SCell Activation and SCell Dormancy, 3rd Generation Partnership Project (3GPP), Mobile Competence Centre, 650, Route Des Lucioles, F-06921 Sophia-Antipolis Cedex, France, vol. Ran WG1, No. Chongqing, China, Oct. 14, 2019-Oct. 20, 2019, Oct. 5, 2019 (Oct. 5, 2019), XP051808862, 18 pages. (This citation is continued to "Cite No. 3" below).

Retrieved from the Internet: URL: https://ftp.3gpp.org/tsg_ran/WG1_RL1/TSGR1_98b/Docs/R1-1911139.zip, R1-1911139 Fast SCell activation and SCell dormancy.docx [retrieved on Oct. 5, 2019] pp. 1, 5, pp. 9-12, p. 1-p. 17.

\* cited by examiner

SECONDARY CELL DORMANCY INDICATION AND APPLICATION DELAY

CROSS-REFERENCE TO RELATED APPLICATION(S)

The present Application for Patent claims priority to pending PCT Patent Application no. PCT/CN2019/115307, filed Nov. 4, 2019, and assigned to the assignee hereof and hereby expressly incorporated by reference herein as if fully set forth below and for all applicable purposes.

TECHNICAL FIELD

The present disclosure relates generally to wireless communication systems, and more particularly to secondary cell (SCell) dormancy indications and reducing application delay times in wireless devices after receiving such dormancy indications.

INTRODUCTION

In wireless communication systems or networks that utilize carrier aggregation (CA) multiple serving cells may serve a particular user equipment (UE) or group of UEs. In some wireless systems, one of the multiple serving cells is designated as a primary cell (PCell), while the other serving cells are designated as secondary cells (SCells). For an activated SCell (i.e., an SCell capable of serving a UE), a communication network may switch operation of an SCell between a dormancy behavior or a non-dormancy behavior, where the dormancy behavior affords power reduction such as through no physical downlink control channel (PDCCH) monitoring, no physical downlink shared channel (PDSCH) reception, or reduced channel status information (CSI) measurement and reporting frequency thereof to name just a few dormancy behaviors that achieve power reduction. The wireless network may further provide a dormancy indication in a PDCCH for the SCells to communicate to UEs whether the activated SCell is in dormancy operation or non-dormancy operation.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to an aspect of the disclosure, a method for wireless communication in a wireless communication system is disclosed. The method includes generating a physical downlink control channel (PDCCH) including a secondary cell (SCell) dormancy indication that is configured to a user equipment (UE) to indicate whether at least one SCell in the wireless communication system is in dormancy-like behavior or non-dormancy-like behavior. The PDCCH is further configured to at least one of (a) implement a first case where the PDCCH provides only the SCell dormancy indication, or (b) implement a second case where the PDCCH provides the SCell dormancy indication and schedules data to the UE. Furthermore, the method includes selecting between the first case and the second case based on a predetermined configuration of elements in the wireless communication system.

According to another aspect of the disclosure, an apparatus for wireless communication in a wireless communication system is disclosed that includes a processor, a transceiver communicatively coupled to the at least one processor, and a memory communicatively coupled to the at least one processor. The processor is configured to generate a physical downlink control channel (PDCCH) including a secondary cell (SCell) dormancy indication that is configured to a user equipment (UE) to indicate whether at least one SCell in the wireless communication system is in dormancy-like behavior or non-dormancy-like behavior, wherein the PDCCH is further configured to at least one of (a) implement a first case where the PDCCH provides only the SCell dormancy indication, or (b) implement a second case where the PDCCH provides the SCell dormancy indication and schedules data to the UE. The processor is also configured to select between the first case and the second case based on a predetermined configuration of elements in the wireless communication system.

According to yet another aspect of the present disclosure, an apparatus for wireless communication in a wireless communication system is disclosed. The apparatus includes means for generating a physical downlink control channel (PDCCH) including a secondary cell (SCell) dormancy indication that is configured to a user equipment (UE) to indicate whether at least one SCell in the wireless communication system is in dormancy-like behavior or non-dormancy-like behavior, wherein the PDCCH is further configured to at least one of implement a first case where the PDCCH provides only the SCell dormancy indication or implement a second case where the PDCCH provides the SCell dormancy indication and schedules data to the UE. Furthermore, the apparatus includes means for selecting between the first case and the second case based on a predetermined configuration of elements in the wireless communication system.

According to another aspect, a non-transitory computer-readable medium storing computer-executable code is disclosed. The code causes a computer to generate a physical downlink control channel (PDCCH) including a secondary cell (SCell) dormancy indication that is configured to a user equipment (UE) to indicate whether at least one SCell in the wireless communication system is in dormancy-like behavior or non-dormancy-like behavior, wherein the PDCCH is further configured to at least one of implement a first case where the PDCCH provides only the SCell dormancy indication, or implement a second case where the PDCCH provides the SCell dormancy indication and schedules data to the UE. The code also causes a computer to select between the first case and the second case based on a predetermined configuration of elements in the wireless communication system.

According to a further aspect of the disclosure, a method for wireless communication in a wireless communication system is disclosed. The method includes generating a predetermined physical downlink control channel (PDCCH) including a dormancy indication for one or more secondary cells (SCells) that is configured to indicate whether the one or more SCells in the wireless communication system exhibit dormancy-like behavior or non-dormancy-like behavior to a UE. The dormancy indication in the predetermined PDCCH is further configured to indicate at least one of the one or more SCells include all activated SCells configured to the UE, the one or more SCells include a subset of activated SCells configured to the UE, the one or more SCells include all SCells configured to the UE including both activated SCells and deactivated Scells, and the one or more SCells include a subset of the SCells configured to the UE.

According to another aspect of the disclosure, an apparatus for wireless communication in a wireless communication system is disclosed that includes a processor, a transceiver communicatively coupled to the at least one processor, and a memory communicatively coupled to the at least one processor. The processor is configured to generate a predetermined physical downlink control channel (PDCCH) including a dormancy indication for one or more secondary cells (SCells) that is configured to indicate whether the one or more SCells in the wireless communication system exhibit dormancy-like behavior or non-dormancy-like behavior to a UE. The dormancy indication in the predetermined PDCCH is further configured to indicate at least one of the one or more SCells include all activated SCells configured to the UE, the one or more SCells include a subset of activated SCells configured to the UE, the one or more SCells include all SCells configured to the UE including both activated SCells and deactivated Scells, and the one or more SCells include a subset of the SCells configured to the UE.

According to yet another aspect of the present disclosure, an apparatus for wireless communication in a wireless communication system is disclosed. The apparatus includes means for generating a predetermined physical downlink control channel (PDCCH) including a dormancy indication for one or more secondary cells (SCells) that is configured to indicate whether the one or more SCells in the wireless communication system exhibit dormancy-like behavior or non-dormancy-like behavior to a UE. The dormancy indication in the predetermined PDCCH is further configured to indicate at least one of the one or more SCells include all activated SCells configured to the UE, the one or more SCells include a subset of activated SCells configured to the UE, the one or more SCells include all SCells configured to the UE including both activated SCells and deactivated Scells, and the one or more SCells include a subset of the SCells configured to the UE.

According to another aspect, a non-transitory computer-readable medium storing computer-executable code is disclosed. The code causes a computer to generate a predetermined physical downlink control channel (PDCCH) including a dormancy indication for one or more secondary cells (SCells) that is configured to indicate whether the one or more SCells in the wireless communication system exhibit dormancy-like behavior or non-dormancy-like behavior to a UE. The dormancy indication in the predetermined PDCCH is further configured to indicate at least one of the one or more SCells include all activated SCells configured to the UE, the one or more SCells include a subset of activated SCells configured to the UE, the one or more SCells include all SCells configured to the UE including both activated SCells and deactivated Scells, and the one or more SCells include a subset of the SCells configured to the UE.

According to still another aspect of the present disclosure, a method for wireless communication in a wireless communication system is disclosed. This method includes generating a physical downlink control channel wake up signal (PDCCH WUS) for transmission outside of the active time of a DRX cycle to alert at least one user equipment (UE) to wake up during the active time of the DRX cycle to receive a PDCCH and/or generating a PDCCH for transmission inside the active time, both the PDCCH WUS and PDCCH respectively including a secondary cell (SCell) dormancy indication configured to indicate whether at least one SCell in the wireless communication system is in a dormancy-like behavior or a non-dormancy-like behavior. The method further includes transmitting one of the PDCCH WUS outside the active time of the DRX cycle and the PDCCH inside the active time of the DRX cycle in the wireless communication system to the at least one UE. Moreover, the method includes setting behavior of the at least one UE such that the at least one UE is operable according to various conditions dependent on whether or not the UE detects the dormancy indication transmitted in the PDCCH WUS or the dormancy indication transmitted in the PDCCH.

According to another aspect of the disclosure, an apparatus for wireless communication in a wireless communication system is disclosed that includes a processor, a transceiver communicatively coupled to the at least one processor, and a memory communicatively coupled to the at least one processor. The processor is configured to generate a physical downlink control channel wake up signal (PDCCH WUS) for transmission outside of the active time of a DRX cycle to alert at least one user equipment (UE) to wake up during the active time of the DRX cycle to receive a PDCCH and generate a PDCCH for transmission inside the active time, both the PDCCH WUS and PDCCH respectively including a secondary cell (SCell) dormancy indication configured to indicate whether at least one SCell in the wireless communication system is in a dormancy-like behavior or a non-dormancy-like behavior. Additionally, the processor is configured to transmit one of the PDCCH WUS outside the active time of the DRX cycle and the PDCCH inside the active time of the DRX cycle in the wireless communication system to the at least one UE. Also, the processor is configured to set behavior of the at least one UE such that the at least one UE is operable according to various conditions dependent on whether or not the UE detects the dormancy indication transmitted in the PDCCH WUS or the dormancy indication transmitted in the PDCCH.

According to yet another aspect of the present disclosure, an apparatus for wireless communication in a wireless communication system is disclosed. The apparatus includes means for generating a physical downlink control channel wake up signal (PDCCH WUS) for transmission outside of the active time of a DRX cycle to alert at least one user equipment (UE) to wake up during the active time of the DRX cycle to receive a PDCCH and generating a PDCCH for transmission inside the active time, both the PDCCH WUS and PDCCH respectively including a secondary cell (SCell) dormancy indication configured to indicate whether at least one SCell in the wireless communication system is in a dormancy-like behavior or a non-dormancy-like behavior. The apparatus also includes means for transmitting one of the PDCCH WUS outside the active time of the DRX cycle and the PDCCH inside the active time of the DRX cycle in the wireless communication system to the at least one UE. Further, the apparatus includes means for setting behavior of the at least one UE such that the at least one UE is operable according to various conditions dependent on whether or not the UE detects the dormancy indication transmitted in the PDCCH WUS or the dormancy indication transmitted in the PDCCH.

According to another aspect, a non-transitory computer-readable medium storing computer-executable code is disclosed. The code causes a computer to generate a physical downlink control channel wake up signal (PDCCH WUS) for transmission outside of the active time of a DRX cycle to alert at least one user equipment (UE) to wake up during the active time of the DRX cycle to receive a PDCCH and generate a PDCCH for transmission inside the active time, both the PDCCH WUS and PDCCH respectively including a secondary cell (SCell) dormancy indication configured to indicate whether at least one SCell in the wireless communication system is in a dormancy-like behavior or a non-dormancy-like behavior. The code also causes a computer to transmit one of the PDCCH WUS outside the active time of the DRX cycle and the PDCCH inside the active time of the DRX cycle in the wireless communication system to the at least one UE. Yet further, the code causes a computer to set behavior of the at least one UE such that the at least one UE is operable according to various conditions dependent on whether or not the UE detects the dormancy indication transmitted in the PDCCH WUS or the dormancy indication transmitted in the PDCCH.

According to an aspect of the disclosure, a method for wireless communication in a wireless communication system is disclosed. The method includes receiving a dormancy indication in a wireless transmission at a user equipment (UE) via a PDCCH WUS prior to an active time of a DRX cycle in the UE, wherein the dormancy indication is configured to communicate whether a serving secondary cell (SCell) is operating according to a dormancy-like behavior or a non-dormancy-like behavior. Further, the method includes setting an application delay time for the dormancy indication after reception of the dormancy indication in the PDCCH WUS, wherein the application delay time is a time for the dormancy indication to take effect after the UE receives the PDCCH WUS dormancy indication.

According to another aspect of the disclosure, an apparatus for wireless communication in a wireless communication system is disclosed that includes a processor, a transceiver communicatively coupled to the at least one processor, and a memory communicatively coupled to the at least one processor. The processor is configured to receive a dormancy indication in a wireless transmission at a user equipment (UE) via a PDCCH WUS prior to an active time of a DRX cycle in the UE, wherein the dormancy indication is configured to communicate whether a serving secondary cell (SCell) is operating according to a dormancy-like behavior or a non-dormancy-like behavior. The processor is also configured to set an application delay time for the dormancy indication after reception of the dormancy indication in the PDCCH WUS, wherein the application delay time is a time for the dormancy indication to take effect after the UE receives the PDCCH WUS dormancy indication.

According to yet another aspect of the present disclosure, an apparatus for wireless communication in a wireless communication system is disclosed. The apparatus includes means for receiving a dormancy indication in a wireless transmission at a user equipment (UE) via a PDCCH WUS prior to an active time of a DRX cycle in the UE, wherein the dormancy indication is configured to communicate whether a serving secondary cell (SCell) is operating according to a dormancy-like behavior or a non-dormancy-like behavior. The apparatus also includes means for setting an application delay time for the dormancy indication after reception of the dormancy indication in the PDCCH WUS, wherein the application delay time is a time for the dormancy indication to take effect after the UE receives the PDCCH WUS dormancy indication.

According to another aspect, a non-transitory computer-readable medium storing computer-executable code is disclosed. The code causes a computer to receive a dormancy indication in a wireless transmission at a user equipment (UE) via a PDCCH WUS prior to an active time of a DRX cycle in the UE, wherein the dormancy indication is configured to communicate whether a serving secondary cell (SCell) is operating according to a dormancy-like behavior or a non-dormancy-like behavior. The code also causes a computer to set an application delay time for the dormancy indication after reception of the dormancy indication in the PDCCH WUS, wherein the application delay time is a time for the dormancy indication to take effect after the UE receives the PDCCH WUS dormancy indication.

According to another aspect of the disclosure, a method for wireless communication in a wireless communication system is disclosed. The method include transmitting a signal from a base station to be received at a user equipment (UE), the signal including a PDCCH with a dormancy indication that indicates a dormancy behavior that a secondary cell (SCell) is configured to enable either a dormancy-like behavior or a non-dormancy-like behavior of the UE in the Scell. The method further includes setting the dormancy behavior to be followed by the UE according to predefined conditions based on the dormancy indication.

According to another aspect of the disclosure, an apparatus for wireless communication in a wireless communication system is disclosed that includes a processor, a transceiver communicatively coupled to the at least one processor, and a memory communicatively coupled to the at least one processor. The processor is configured to transmit a signal from a base station to be received at a user equipment (UE), the signal including a PDCCH with a dormancy indication that indicates a dormancy behavior that a secondary cell (SCell) is configured to enable either a dormancy-like behavior or a non-dormancy-like behavior of the UE in the SCell. Additionally, the processor is configured to set the dormancy behavior to be followed by the UE according to predefined conditions based on the dormancy indication.

According to yet another aspect of the present disclosure, an apparatus for wireless communication in a wireless communication system is disclosed. The apparatus includes means for transmitting a signal from a base station to be received at a user equipment (UE), the signal including a PDCCH with a dormancy indication that indicates a dormancy behavior that a secondary cell (SCell) is configured to enable either a dormancy-like behavior or a non-dormancy-like behavior of the UE in the Scell. The apparatus also includes means for setting the dormancy behavior to be followed by the UE according to predefined conditions based on the dormancy indication.

According to another aspect, a non-transitory computer-readable medium storing computer-executable code is disclosed. The code causes a computer to transmit a signal from a base station to be received at a user equipment (UE), the signal including a PDCCH with a dormancy indication that indicates a dormancy behavior that a secondary cell (SCell) is configured to enable either a dormancy-like behavior or a non-dormancy-like behavior of the UE in the SCell. The code also causes a computer to set the dormancy behavior to be followed by the UE according to predefined conditions based on the dormancy indication.

According to an aspect of the disclosure, a method for wireless communication in a wireless communication system is disclosed. The method includes generating a physical downlink control channel (PDCCH) including a secondary cell (SCell) dormancy indication that is configured to indicate whether the dormancy related behavior of at least one SCell in the wireless communication system is in a dormancy-like behavior or in a non-dormancy-like behavior, wherein the dormancy indication comprises one or more bits. The method further includes configuring at least one UE in the wireless communication network to interpret the one or more bits in the dormancy indication according to predefined criteria.

According to another aspect of the disclosure, an apparatus for wireless communication in a wireless communication system is disclosed that includes a processor, a transceiver communicatively coupled to the at least one processor, and a memory communicatively coupled to the at least one processor. The processor is configured to generate a physical downlink control channel (PDCCH) including a secondary cell (SCell) dormancy indication that is configured to indicate whether the dormancy related behavior of at least one SCell in the wireless communication system is in a dormancy-like behavior or in a non-dormancy-like behavior, wherein the dormancy indication comprises one or more bits. The processor is also configured to configure at least one UE in the wireless communication network to interpret the one or more bits in the dormancy indication according to predefined criteria.

According to yet another aspect of the present disclosure, an apparatus for wireless communication in a wireless communication system is disclosed. The apparatus includes means for generating a physical downlink control channel (PDCCH) including a secondary cell (SCell) dormancy indication that is configured to indicate whether the dormancy related behavior of at least one SCell in the wireless communication system is in a dormancy-like behavior or in a non-dormancy-like behavior, wherein the dormancy indication comprises one or more bits. Additionally, the apparatus includes means for configuring at least one UE in the wireless communication network to interpret the one or more bits in the dormancy indication according to predefined criteria.

According to another aspect, a non-transitory computer-readable medium storing computer-executable code is disclosed. The code causes a computer to generate a physical downlink control channel (PDCCH) including a secondary cell (SCell) dormancy indication that is configured to indicate whether the dormancy related behavior of at least one SCell in the wireless communication system is in a dormancy-like behavior or in a non-dormancy-like behavior, wherein the dormancy indication comprises one or more bits. Additionally, the code causes a computer to configure at least one UE in the wireless communication network to interpret the one or more bits in the dormancy indication according to predefined criteria.

These and other aspects of the present disclosure will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 10 is a block diagram illustrating an example of a hardware implementation for a scheduled entity apparatus employing a processing system.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
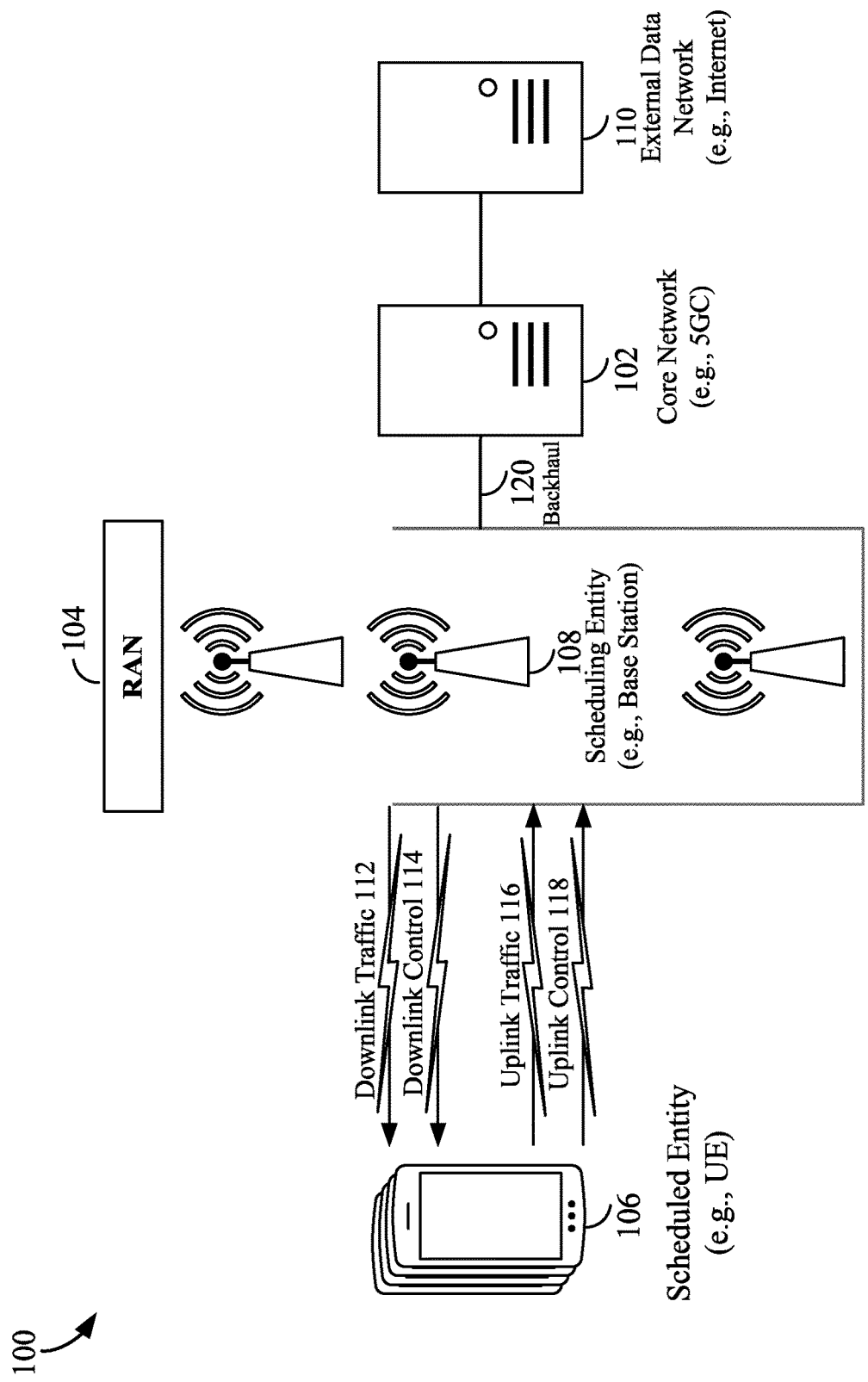
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
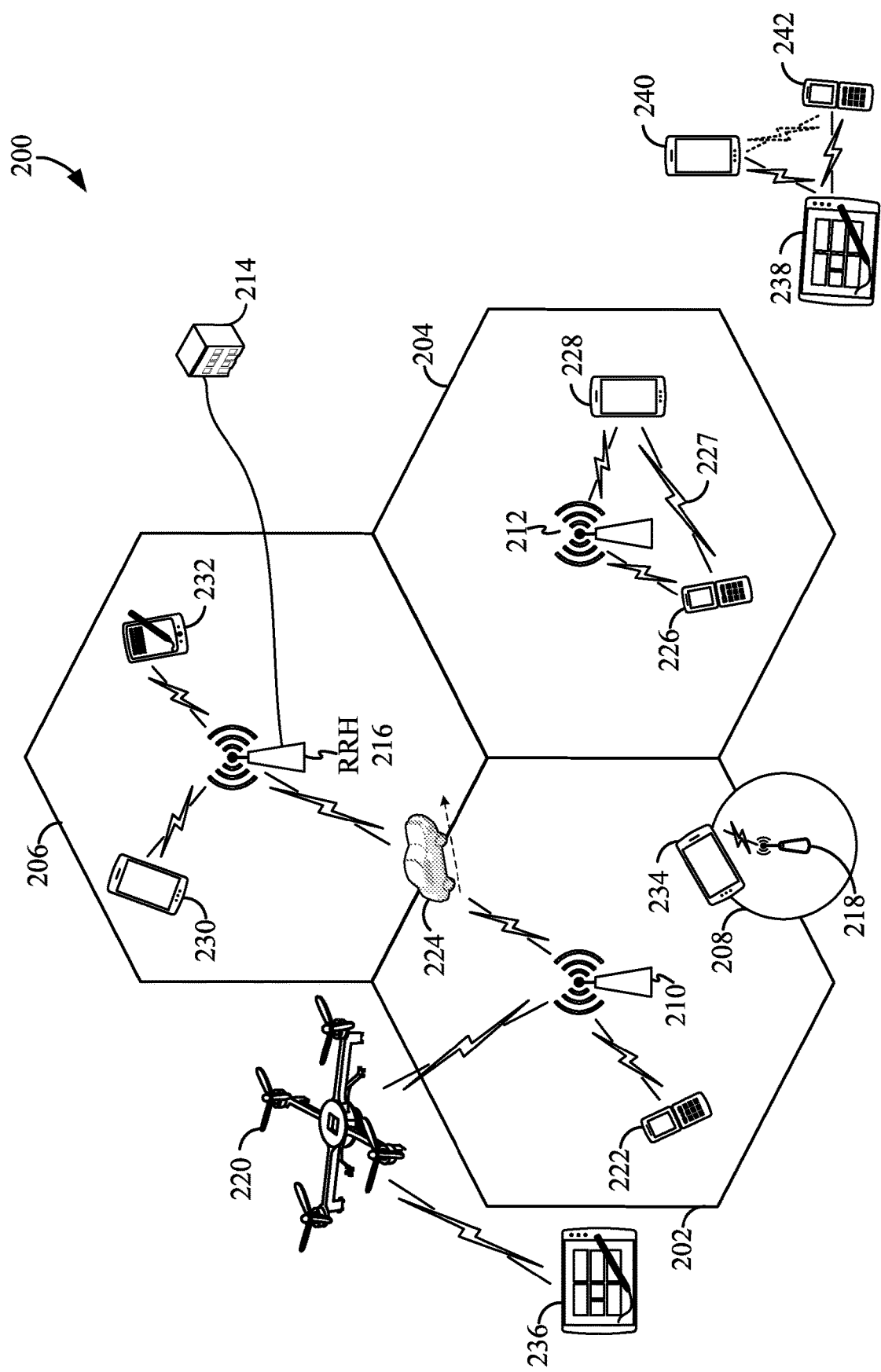
FIG. 2 is a conceptual illustration of an example of a wireless communications network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
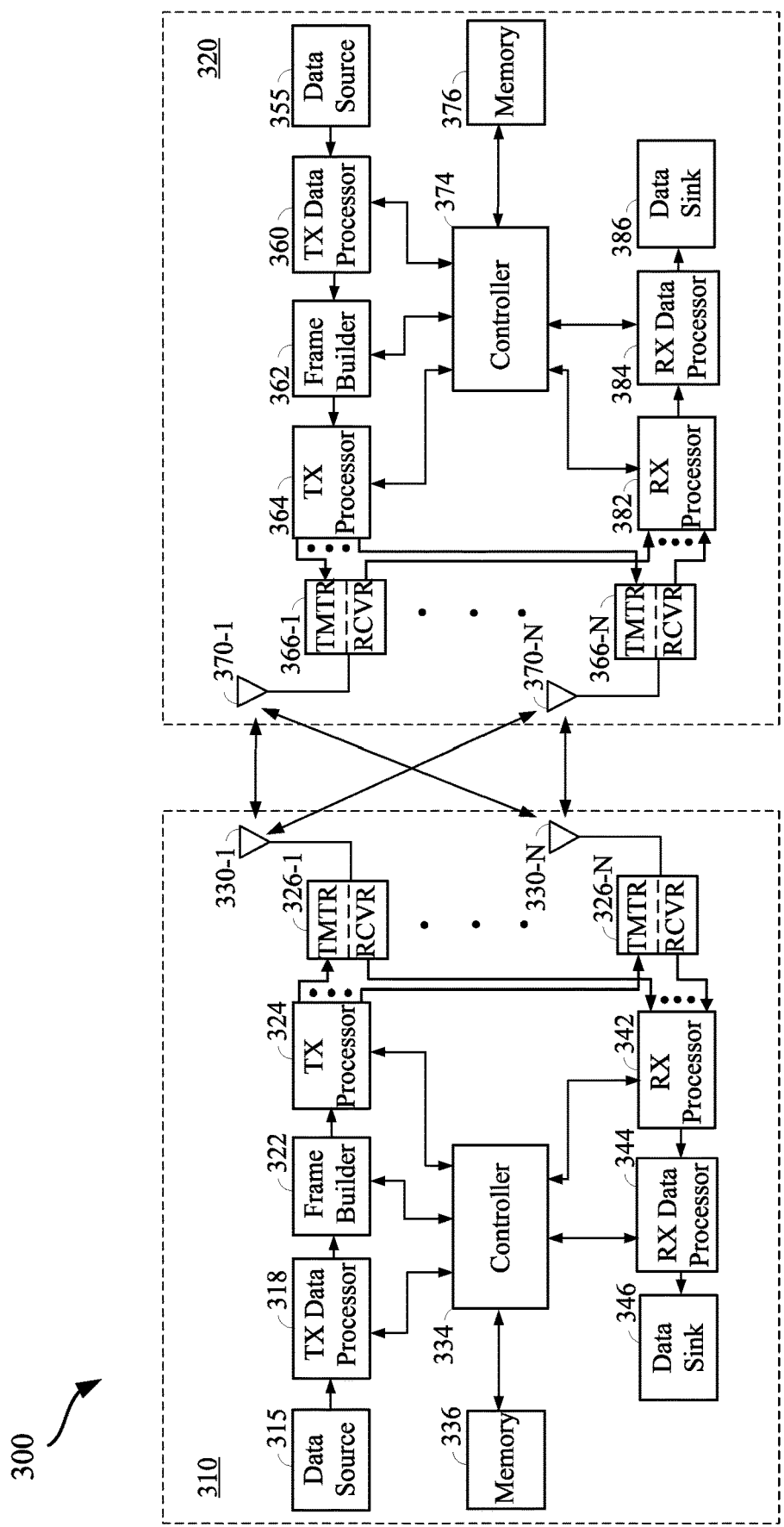
FIG. 3 is a block diagram conceptually illustrating an example of an eNB or gNB in communication with a user equipment (UE) in a wireless communications network or system in accordance with certain aspects of the present disclosure.

FIG. 3 is a block diagram conceptually illustrating an example of an eNB or gNB in communication with a user equipment (UE) in a wireless communications network, in accordance with certain aspects of the present disclosure. In this example, the block diagram 300 shows a first wireless node 310, which may be a base station or gNB, and a second wireless node 320, such as a UE of the wireless communication system 300. The first wireless node 310 is a transmitting entity for the downlink and a receiving entity for the uplink, such as a scheduling entity according to some aspects. The second wireless node 320 is a transmitting entity for the uplink and a receiving entity for the downlink, such as a scheduled entity according to some aspects. According to further aspects, a "transmitting entity" may be an independently operated apparatus or wireless node capable of transmitting data via a wireless channel, and a "receiving entity" may be an independently operated apparatus or wireless node capable of receiving data via a wireless channel.

For transmitting data, the first wireless node 310 comprises a transmit data processor 318, a frame builder 322, a transmit processor 324, a plurality of transceivers 326-1 to 326-N, and a plurality of antennas 330-1 to 330-N. The first wireless node 310 also comprises a controller 334 configured to control operations of the first wireless node 310, as discussed further below.

In operation, the transmit data processor 318 receives data (e.g., data bits) from a data source 315, and processes the data for transmission. For example, the transmit data processor 318 may encode the data (e.g., data bits) into encoded data, and modulate the encoded data into data symbols. The transmit data processor 318 may support different modulation and coding schemes (MCSs). For example, the transmit data processor 318 may encode the data (e.g., using low-density parity check (LDPC) encoding) at any one of a plurality of different coding rates. Also, the transmit data processor 318 may modulate the encoded data using any one of a plurality of different modulation schemes, including, but not limited to, BPSK, QPSK, 16QAM, 64QAM, 64APSK, 128APSK, 256QAM, 1024QAM, and 256APSK.

In certain aspects, the controller 334 may send a command to the transmit data processor 318 specifying which modulation and coding scheme (MCS) to use (e.g., based on channel conditions of the downlink), and the transmit data processor 318 may encode and modulate data from the data source 315 according to the specified MCS. It is to be appreciated that the transmit data processor 318 may perform additional processing on the data such as data scrambling, and/or other processing. The transmit data processor 318 outputs the data symbols to the frame builder 322.

The frame builder 322 constructs a frame (also referred to as a packet), and inserts the data symbols into a data payload of the frame. Exemplary frame structures or formats will be discussed in more detail below. The frame builder 322 outputs the frame to the transmit processor 324. The transmit processor 324 processes the frame for transmission on the downlink. For example, the transmit processor 324 may support different transmission modes such as an orthogonal frequency-division multiplexing (OFDM) transmission mode and a single-carrier (SC) transmission mode. In this example, the controller 334 may send a command to the transmit processor 324 specifying which transmission mode to use, and the transmit processor 324 may process the frame for transmission according to the specified transmission mode.

In certain aspects, the transmit processor 324 may support multiple-output-multiple-input (MIMO) transmissions. In these aspects, the first wireless node 310 includes multiple antennas 330-1 to 330-N and multiple transceivers 326-1 to 326-N (e.g., one for each antenna). The transmit processor 324 may perform spatial processing on the incoming frames and provide a plurality of transmit frame streams for the plurality of antennas. The transceivers 326-1 to 326-N receive and process (e.g., convert to analog, amplify, filter, and frequency upconvert) the respective transmit frame streams to generate transmit signals for transmission via the antennas 330-1 to 330-N. Additionally, the For transmitting data, the second wireless node or UE 320 comprises a transmit data processor 360, a frame builder 362, a transmit processor 364, a plurality of transceivers 366-1 to 366-N, and a plurality of antennas 370-1 to 370-N. The UE 320 may transmit data to the first wireless node 310 on the uplink, and/or transmit data to another access terminal (e.g., for peer-to-peer communication). The UE 320 also comprises a controller 374 configured to control operations of the UE 320, as discussed further below.

In operation, the transmit data processor 360 receives data (e.g., data bits) from a data source 355, and processes (e.g., encodes and modulates) the data for transmission. The transmit data processor 360 may support different MCSs. For example, the transmit data processor 360 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 374 may send a command to the transmit data processor 360 specifying which MCS to use (e.g., based on channel conditions of the uplink), and the transmit data processor 360 may encode and modulate data from the data source 355 according to the specified MCS. It is to be appreciated that the transmit data processor 360 may perform additional processing on the data. The transmit data processor 360 outputs the data symbols to the frame builder 362.

The frame builder 362 constructs a frame, and inserts the received data symbols into a data payload of the frame. Exemplary frame structures or formats are discussed further below. The frame builder 362 outputs the frame to the transmit processor 364. The transmit processor 364 processes the frame for transmission. For example, the transmit processor 364 may support different transmission modes such as an OFDM transmission mode and an SC transmission mode. In this example, the controller 374 may send a command to the transmit processor 364 specifying which transmission mode to use, and the transmit processor 364 may process the frame for transmission according to the specified transmission mode.

In certain aspects, the transmit processor 364 may support multiple-output-multiple-input (MIMO) transmission. In these aspects, the UE 320 includes multiple antennas 370-1 to 370-N and multiple transceivers 366-1 to 366-N (e.g., one for each antenna). The transmit processor 364 may perform spatial processing on the incoming frame and provide a plurality of transmit frame streams for the plurality of antennas. The transceivers 366-1 to 366-N receive and process (e.g., convert to analog, amplify, filter, and frequency upconvert) the respective transmit frame streams to generate transmit signals for transmission via the antennas 370-1 to 370-N. Additionally, the transmit processor 364 may include layer mapping, precoding, resource element mapping functionalities for mapping to various antenna ports, wherein an antenna port is logical concept where each antenna port represents a specific channel model, where each antenna port will have its own reference signal. Each antenna port will carry its own resource grid and a specific set of reference signals in the grid.

For receiving data, the access point 310 comprises a receive processor 342, and a receive data processor 344. In operation, the transceivers 326-1 to 326-N receive signals (e.g., from the UE 320) via the antennas 330-1 to 330-N, and process (e.g., frequency downconvert, amplify, filter and convert to digital) the received signals.

The receive processor 342 receives the outputs of the transceivers 326-1 to 326-N, and processes the outputs to recover data symbols. For example, the first wireless node 310 may receive data (e.g., from the UE 320) in a frame. In this example, the receive processor 342 may detect the start of the frame using the STF sequence in the preamble of the frame. The receive processor 342 may also use the STF for automatic gain control (AGC) adjustment. The receive processor 342 may also perform channel estimation (e.g., using the channel estimation (CE) sequence or field in the preamble of the frame) and perform channel equalization on the received signal based on the channel estimation.

The receive processor 342 may also recover information (e.g., MCS scheme) from the header of the frame, and send the information to the controller 334. After performing channel equalization, the receive processor 342 may recover data symbols from the frame, and output the recovered data symbols to the receive data processor 344 for further processing. It is to be appreciated that the receive processor 342 may perform other processing.

The receive data processor 344 receives the data symbols from the receive processor 342 and an indication of the corresponding MSC scheme from the controller 334. The receive data processor 344 demodulates and decodes the data symbols to recover the data according to the indicated MSC scheme, and outputs the recovered data (e.g., data bits) to a data sink 346 for storage and/or further processing.

As discussed above, the UE 320 may transmit data using an OFDM transmission mode or an SC transmission mode. In this case, the receive processor 342 may process the receive signal according to the selected transmission mode. Also, as discussed above, the transmit processor 364 may support multiple-input-multiple-output (MIMO) transmission. In this case, the first wireless node 310 includes multiple antennas 330-1 to 330-N and multiple transceivers 326-1 to 326-N (e.g., one for each antenna). Each transceiver 326 receives and processes (e.g., frequency downconverts, amplifies, filters, and converts to digital) the signal from the respective antenna 330. The receive processor 342 may perform spatial processing on the outputs of the transceivers 326-1 to 226-N to recover the data symbols.

For receiving data, the UE 320 comprises a receive processor 382, and a receive data processor 384. In operation, the transceivers 366-1 to 366-N receive signals (e.g., from the first wireless node 310 or another access terminal) via the antennas 370-1 to 370-N, and process (e.g., frequency downconvert, amplify, filter and convert to digital) the received signals.

The receive processor 382 receives the outputs of the transceivers 366-1 to 366-N, and processes the outputs to recover data symbols. For example, the UE 320 may receive data (e.g., from the first wireless node 310 or another access terminal) in a frame, as discussed above. The receive processor 382 may also recover information (e.g., MCS scheme) from the header of the frame, and send the information to the controller 374. After performing channel equalization, the receive processor 382 may recover data symbols from the frame, and output the recovered data symbols to the receive data processor 384 for further processing. It is to be appreciated that the receive processor 382 may perform other processing.

The receive data processor 384 receives the data symbols from the receive processor 382 and an indication of the corresponding MSC scheme from the controller 374. The receive data processor 384 demodulates and decodes the data symbols to recover the data according to the indicated MSC scheme, and outputs the recovered data (e.g., data bits) to a data sink 386 for storage and/or further processing.

As discussed above, the first wireless terminal 310 or another access terminal may transmit data using an OFDM transmission mode or a SC transmission mode. In this case, the receive processor 382 may process the receive signal according to the selected transmission mode. Also, as discussed above, the transmit processor 324 may support multiple-output-multiple-input (MIMO) transmission. In this case, the UE 320 includes multiple antennas 370-1 to 370-N and multiple transceivers 366-1 to 366-N (e.g., one for each antenna). Each transceiver 366 receives and processes (e.g., frequency downconverts, amplifies, filters, and converts to digital) the signal from the respective antenna. The receive processor 382 may perform spatial processing on the outputs of the transceivers to recover the data symbols.

As shown in FIG. 3, the first wireless terminal 310 also comprises a memory 336 coupled to the controller 334. The memory 336 may store instructions that, when executed by the controller 334, cause the controller 334 to perform one or more of the operations described herein. Similarly, the UE 320 also comprises a memory 376 coupled to the controller 374. The memory 376 may store instructions that, when executed by the controller 374, cause the controller 374 to perform the one or more of the operations described herein.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

As referred to within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE. In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., the PDCCH), and the data region 414 may carry data channels (e.g., PDCCH or PUSCH). Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Figure 4:
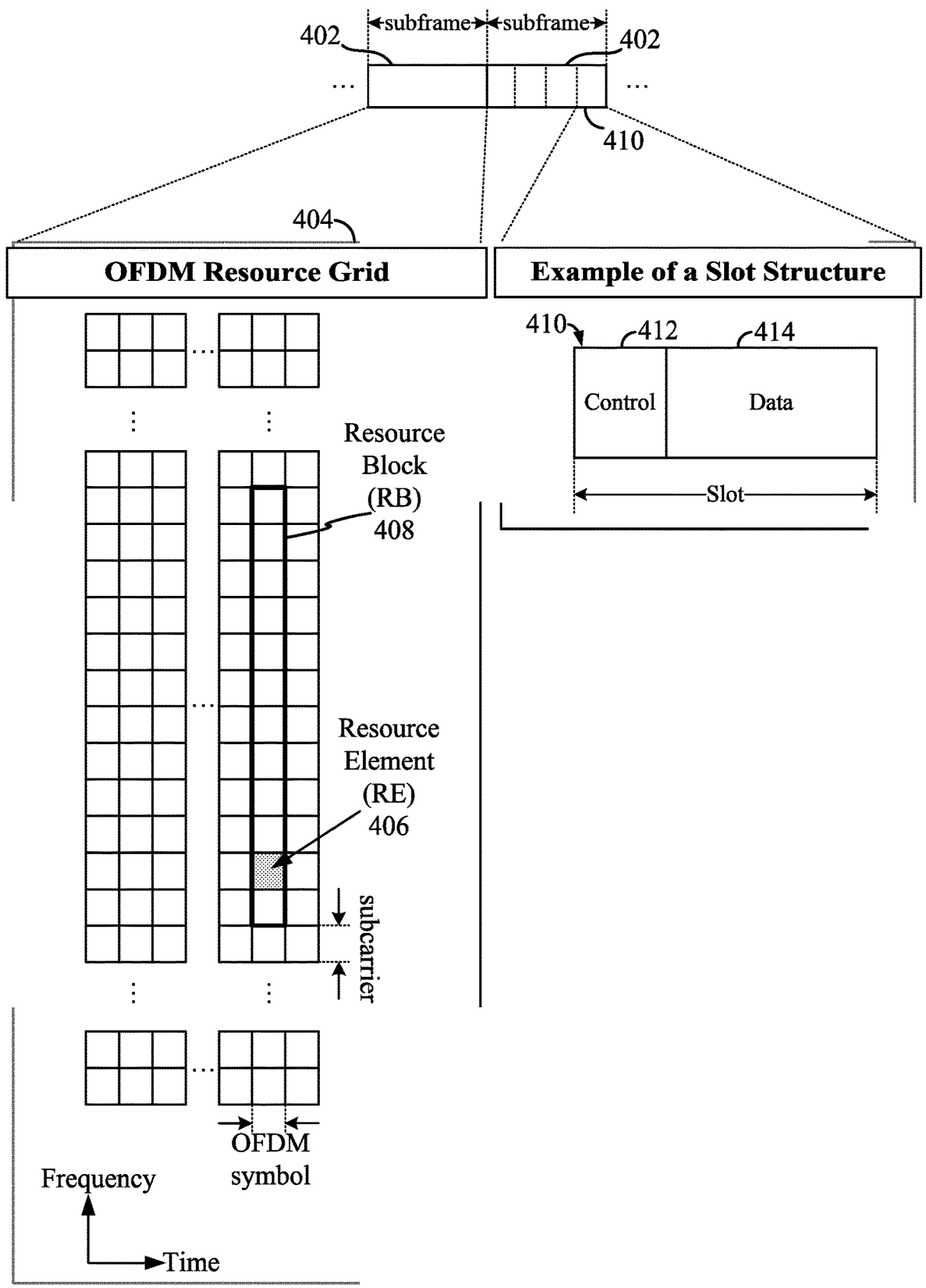
FIG. 4 illustrates an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative-acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1-4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels. These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

It is noted that in 5G NR, for example, the four main reference signals used in transmissions are the demodulation reference signal (DMRS), the phase-tracking reference signal (PTRS), the sounding reference signal (SRS), and the channel-state information reference signal (CSI-RS). DMRSs are used in 5G NR to estimate the radio channel for demodulation, such as estimation at a gNB or at a UE. Furthermore, DMRSs may be UE-specific, are capable of being beamformed, may be confined in a scheduled resource, and may be transmitted only when necessary, both in DL and in UL transmissions. To support multiple-layer MIMO transmission, multiple orthogonal DMRS ports can be scheduled, one for each layer. Typically, the basic DMRS pattern is front loaded, as the DMRS design takes into account the early decoding requirement to support low-latency applications. For low-speed scenarios, DMRS may use low density in the time domain.

Further, while not explicitly illustrated in FIG. 4, it is noted that 5G NR has introduced the use of a bandwidth part (BWP), which may consist of a subset of physical resource blocks (PRBs) or resource blocks (RBs), such as contiguous set of two or more RBs 408 as illustrated in FIG. 4. The use of BWPs helps to reduce power consumption of 5G NR devices through bandwidth adaptation, which allows a UE to only be active on a wide bandwidth in bursty traffic situations, for example, for a short time period, while subsequently being allowed to be active on a narrow bandwidth for rest of the time duration of a transmission. The BWP is a subset of contiguous RBs on a carrier. In current development, 5G NR allows up to four bandwidth parts to be configured in a UE for each of the UL and DL transmission directions. At any given time, however, only one BWP will be active for each transmission direction (i.e., UL and DL). BWP allows the UE to be able to receive transmissions using a narrow portion of bandwidth, while also being adaptive to switch to a greater bandwidth portion when required by the network, which informs the UE to switch. Additionally, it is noted that configuration parameters for each BWP may include numerology, bandwidth size, frequency location, and a control resource set (CORESET).

As background, it is noted here that discontinuous reception (DRX) allows a UE to go to sleep to save power, with the UE only waking up periodically to monitor a PDCCH for potential DL reception and UL transmission. The DRX cycle then consists of sleep or inactive portions, which may also be referred to herein as "outside the active time" or "outside the on duration time," and the wakeup portion, which may be referred to as an "on duration" time or a part of an "active time" when the UE monitors the PDCCH that schedules data. If the PDCCH is monitored, the on duration time will be extended by some extended portion time, which, in total, may be termed the "active time" that includes the on duration time and the extended portion time. Additionally, it is noted that the present methods and apparatus may have particular applicability to UEs in a connected mode DRX (CDRX) which differs from an idle mode DRX where a UE is not in the connected mode.

Figure 5:
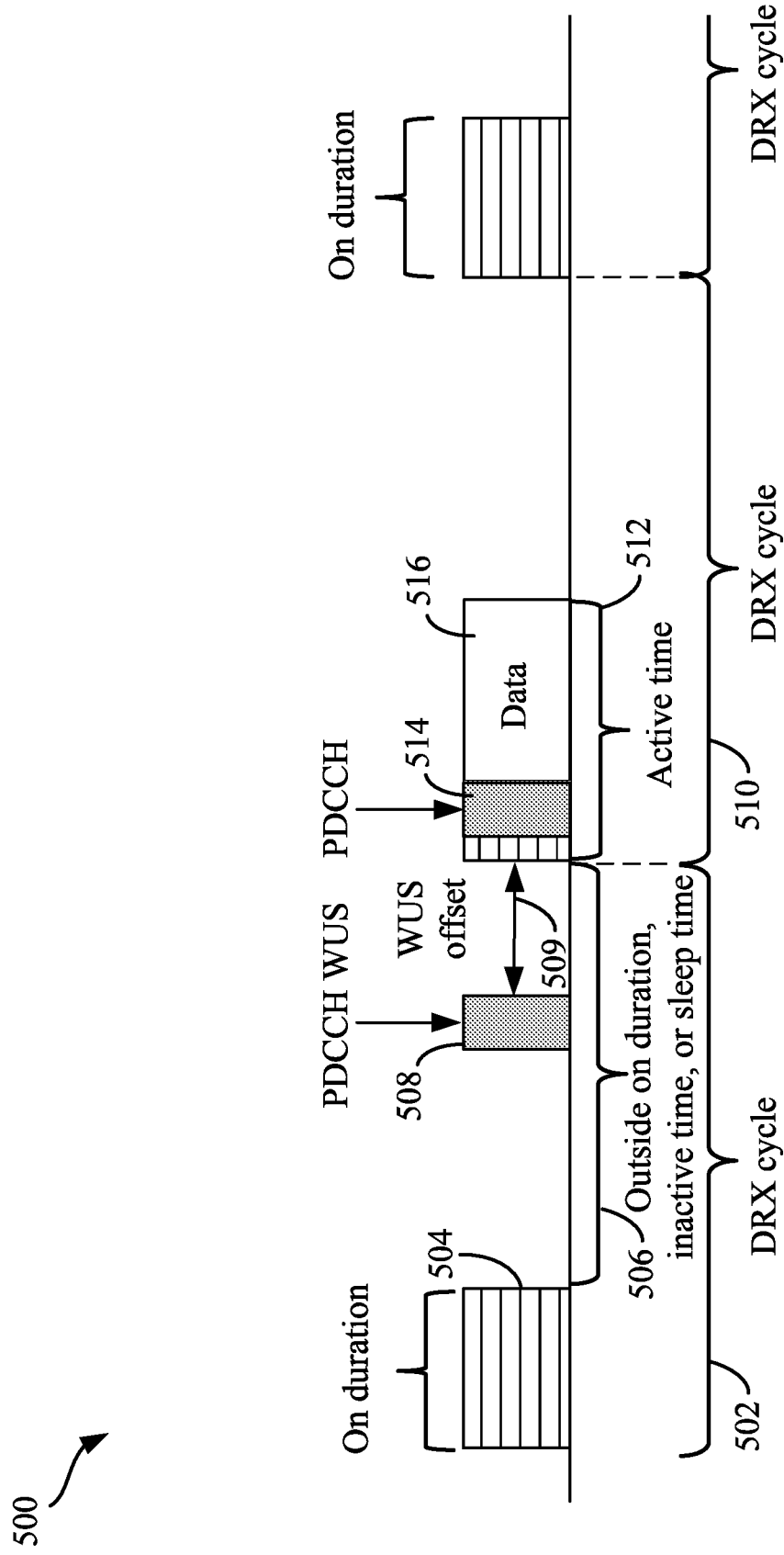
FIG. 5 illustrates an example of timing for discontinuous reception (DRX) cycle according to aspects of the present disclosure.

As an illustration of a DRX cycle, FIG. 5 shows a timeline 500 of events occurring during a DRX cycle according to aspects of the present disclosure. Timeline 500 shows one DRX cycle 502 including an on-duration time 504 and an inactive time 506 (or alternatively outside of an on duration time or outside of an active time). Since no PDCCH is received during the on duration time 504, this time 504 is not extended beyond the configured on duration time period. For this particular example timeline 500, it is noted that in 5G NR Release 16, a wake up signal (WUS) is defined, where the occurrence of the WUS is monitored by the UE outside of the on duration time or active time; e.g., during the "outside on duration", inactive, or sleep time 506. An example of an WUS is shown at 508 in FIG. 5. The WUS 508 is used to indicate whether the UE should wake up for PDCCH monitoring after some WUS offset time period 509. One way to implement a WUS design is to define a special PDCCH as the WUS, which is termed the "PDCCH WUS" in this disclosure. According to some further aspects, the PDCCH WUS may be a UE group common PDCCH that carries wake up information for a group of UEs. Moreover, because the PDCCH WUS 508 is transmitted during a time outside of the on duration or inactive time 506, the UE may be configured to wake up at some predetermined time during the inactive time 506 to monitor for the PDCCH WUS 508.

When a next DRX cycle 510 begins, the on duration time starts, which is shown within active time 512. The UE then receives a PDCCH 514, which provides, among other things, scheduling information for data to be received in a PDSCH and illustrated at 516. Of note, since a PDCCH 514 is received along with data, the active time 512 will be longer than or extends the normal on duration time. The use of a WUS such as 508 allows a UE to detect the PDCCH with lower complexity than a regular PDCCH that is be monitored within an on duration time period. Therefore, further power savings can be achieved by using a WUS in addition to the conventional DRX mechanisms.

As mentioned earlier, in wireless communication systems employing carrier aggregation (CA), a UE is configured with multiple serving cells. One of the serving cell is a special cell that is called the primary cell (PCell). The other serving cells are called secondary cells (SCells). In particular operations, a UE may be configured to monitor the WUS, such as PDCCH WUS 508, transmitted on the PCell. As discussed above, the WUS indicates to a UE whether the UE should wake up and monitor the PDCCH in a next on duration time period in a next DRX cycle (e.g., cycle 510 shown in FIG. 5). Additionally, according to some aspects, the WUS will serve to wake up the PCell and all SCells, and may be further configured as a type of PDCCH (i.e., the PDCCH WUS).

Additionally, for purposes of the present disclosure, it is noted that 5G NR Release 16 has defined a new UE behavior for an activated SCell, called the SCell dormancy-like behavior, which is different from the previously known LTE SCell dormant state. When an activated SCell is operating in the dormancy-like behavior, UE activity is reduced on the SCell for power savings. The dormancy-like behavior may include operations such as no PDCCH monitoring, no PDSCH reception, and reduced channel state information (CSI) measurement and reporting frequency, as some notable examples. A network or communication system can switch an SCell between non-dormancy-like behavior and dormancy-like behavior. When the SCell is in a non-dormancy-like behavior, the UE will have full utilization of the SCell as per normal operation.

As mentioned before, a wireless network may further provide a dormancy indication field (or simply "dormancy indication") in a PDCCH in order to communicate to UEs whether an activated SCell is in a dormancy-like operation or a non-dormancy-like operation. When multiple SCells are configured to a UE, the dormancy indication can be applied to individual SCells or to groups of SCells. Of still further note, the 3rd Generation Partnership Project (3GPP) has decided that a PDCCH that contains the SCell dormancy indication field can be monitored inside or during the active time of a DRX cycle or outside the active time of the DRX cycle. When a UE is outside the active time, the PDCCH may be the PDCCH WUS that is monitored outside the active time. In this case, the PDCCH (i.e., PDCCH WUS) does not schedule any data unlike a normal PDCCH during active times.

Correlatively, when the UE is inside the active time, the PDCCH is not a PDCCH WUS as the WUS is monitored only outside active time. Here, the PDCCH may operate according to at least two different cases. In the first case (Case 1), the PDCCH indicates only the SCell dormancy. In the other case (Case 2), the PDCCH may indicate SCell dormancy and also schedule a serving cell (and associated data). In certain aspects, these two cases may be dynamically selected based on the PDCCH content (e.g., a field or combination of some fields in the PDCCH indicates which case applies for the PDCCH).

In further aspects, the SCell dormancy indication field may be configured as a bit string (i.e., a bitmap) that contains an "X" number of bits. It is noted that when multiple SCells are configured to a UE, the dormancy indication field can be applied to individual SCells or SCell groups. As examples, the bit string in the dormancy indication field can support at least one of the following functions: (1) each bit indicates the dormancy (i.e., dormancy-like behavior or non-dormancy-like behavior) for one SCell, (2) each bit indicates the dormancy for a group of SCells, or (3) the bit string may indicate that an SCell group contains a single SCell as a special case. Of note here, it will be appreciated that the indication of the dormancy per each SCell, in general requires more bits (and thus overhead) than a single indication covering a group of SCells.

As mentioned above, when a UE is inside the active time of a DRX cycle, the PDCCH for SCell dormancy indication could support both case 1 where the PDCCH schedules data and provides the SCell dormancy indication, or case 2 where the PDCCH only provides the SCell dormancy indication.

According to aspects of the present disclosure, method and apparatus are disclosed to select between these two cases apart from or beyond a dynamic selection based on the PDCCH content. In particular, the selection between these two cases may be based on the particular configuration of system elements. That is, the network may be configured to select between the two cases based on a media access control (MAC) control element (MAC-CE) or the radio resource control (RRC) configuration. A UE would not be expected to handle the case (i.e., a particular case is considered to be an error case) when an activated SCell is in a dormancy-like behavior and the Scell is scheduled for DL PDSCH reception by a PDCCH monitored on the PCell. If the case is configured by network, UE behavior is not specified.

Figure 6:
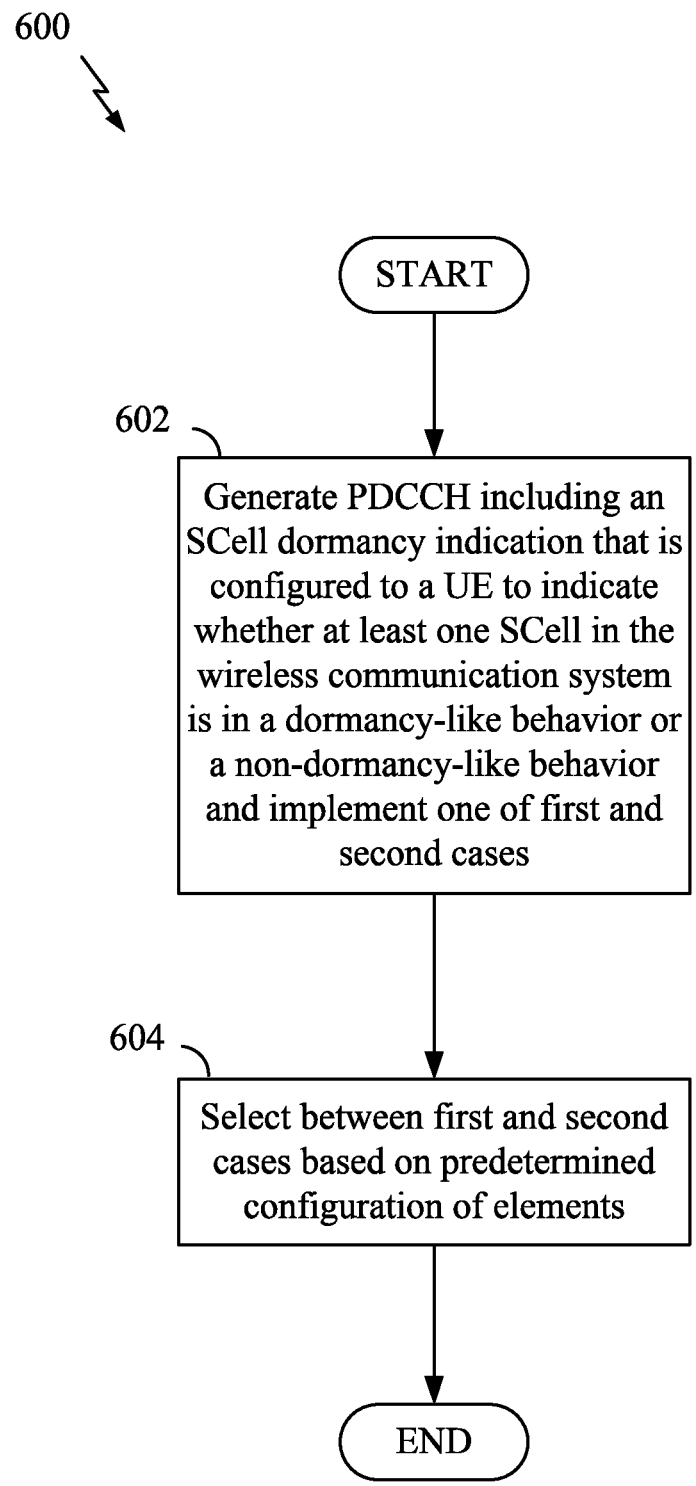
FIG. 6 illustrates a flow diagram of an example method for selecting between different dormancy indication cases in a wireless communication system according to aspects of the present disclosure.

FIG. 6 illustrates an example flow diagram of method 600 for selection between the two cases discussed above. As shown in FIG. 6, method 600 includes generating a physical downlink control channel (PDCCH) including a secondary cell (SCell) dormancy indication that is configured to a user equipment (UE) to indicate whether at least one SCell in the wireless communication system is in a dormancy-like behavior or a non-dormancy-like behavior and to implement one of first and second case. In particular, the processes of block 602 may include configuring the PDCCH to either implement a first case where the PDCCH provides only the SCell dormancy indication to a user equipment (UE) or a second case where the PDCCH provides the SCell dormancy indication and schedules data to the at least one UE.

Method 600 further includes selecting between the first case and the second case based on a predetermined configuration of elements in the wireless communication system as shown at block 604. According to one aspect, the predetermined configuration of elements may include a media access control (MAC) control element (MAC-CE) configuration and selection of the cases based thereon. In another aspect, a radio resource control (RRC) configuration of the elements in the wireless communication system may be used to select between the two cases.

In other aspects, method 600, and process 604 in particular, may include selecting between the first case and the second case by configuring elements in the wireless communication system to treat the PDCCH implementing either the second case (i.e., the PDCCH providing the SCell dormancy indication and scheduling data to the UE) as an error case when an activated SCell is in dormancy-like behavior and the SCell is scheduled for data reception (i.e., receipt of a PDSCH from the PCell) by a PDCCH monitored on the on a primary cell (PCell) in the wireless communication system.

In yet other aspects, method 600 may include configuring the communication system to cause extension of an on duration time during an active time in a DRX cycle in the at least one UE when the PDCCH implements the first case (i.e., the PDCCH only providing an SCell dormancy indication). In still other aspects, method 600 may include configuring the communication system to not extend an on duration time during an active time in a DRX cycle in the UE when the PDCCH implements the first case (the PDCCH provides only the SCell dormancy indication to the UE). Method 600 may also include configuring the communication system to cause extension of an on duration time during an active time in a discontinuous reception (DRX) cycle in the at least one UE when the PDCCH implements the second case (i.e., the PDCCH provides the SCell dormancy indication and schedules data to the at least one UE).

Figure 7:
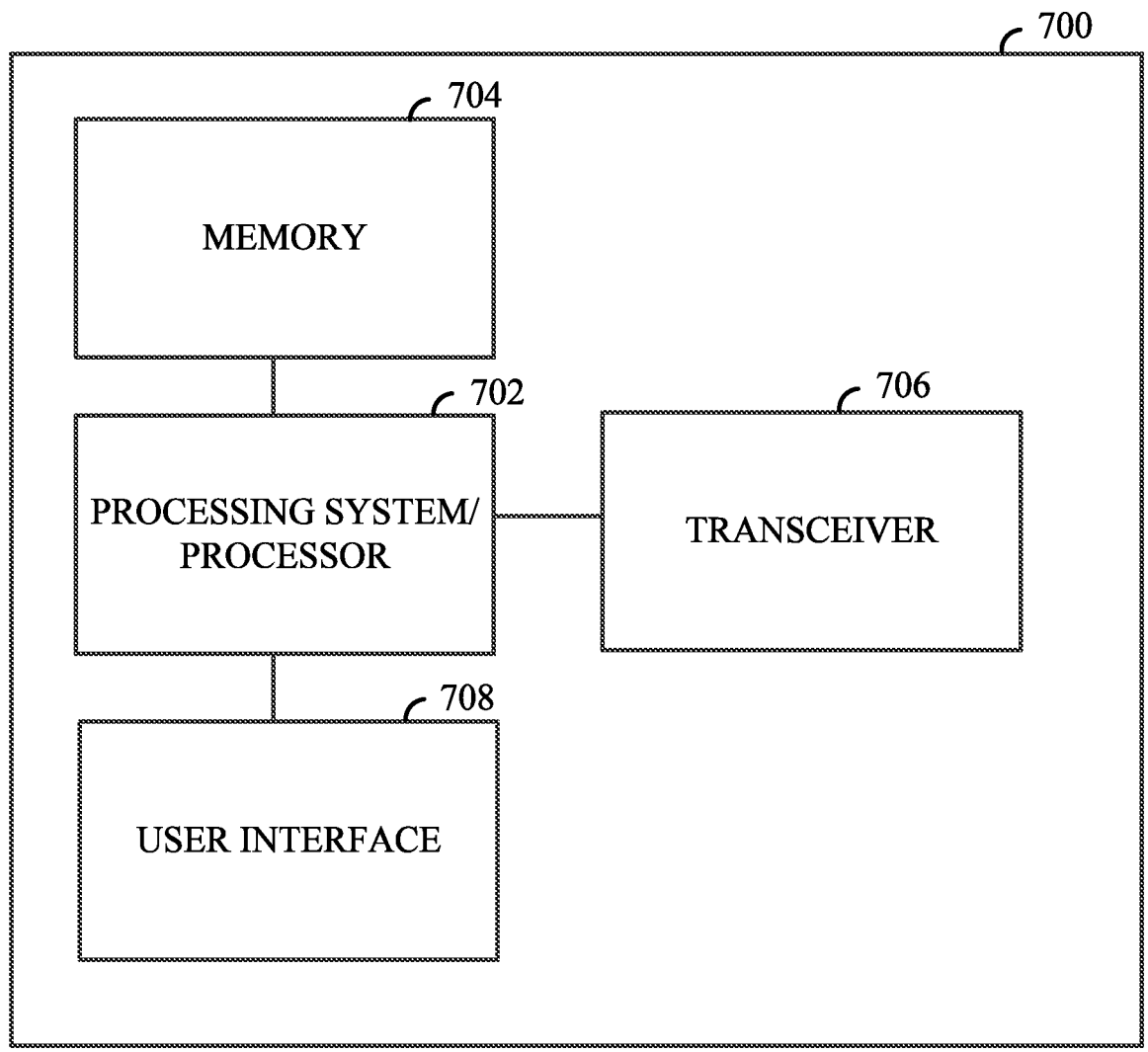
FIG. 7 illustrates an exemplary device or apparatus for wireless communication in a wireless communication system in accordance with certain aspects of the present disclosure.

FIG. 7 illustrates an exemplary device or apparatus 700 for wireless communication in a wireless communication system (e.g., see FIG. 2) in accordance with certain aspects of the present disclosure. The device 700 includes at least one processor or processing system 702, at least one memory 704 communicatively coupled to the at least one processor 702, and a transceiver 706 communicatively coupled to the at least one processor 702. In aspects, device 700 may be configured to operate in a base station (e.g., scheduling entity 108 or wireless node 310 as two examples) to perform one or more of the operations described above in connection with FIG. 6. In particular, the at least one processor 702 may be configured to generate a physical downlink control channel (PDCCH) including a secondary cell (SCell) dormancy indication that is configured to a user equipment (UE) to indicate whether at least one SCell in the wireless communication system is in dormancy-like behavior or non-dormancy-like behavior. The PDCCH is further configured in device 700 to at least one of implementing a first case where the PDCCH provides only the SCell dormancy indication, or implement a second case where the PDCCH provides the SCell dormancy indication and schedules data to the UE. Additionally, the at least one processor may be configured to select (or cause selection in other devices (e.g., UEs)) between the first case and the second case based on a predetermined configuration of elements in the wireless communication system.

According to further aspects, it is noted that an SCell can be either an activated cell or a deactivated cell. As mentioned earlier, dormancy-like behavior and non-dormancy-like behavior are typically only defined for activated SCells. In certain aspects, however, the SCell dormancy indication field could be configured to cover both activated SCells and deactivated SCells. The dormancy indication will only take effect, however, for activated SCells as would be evident to those skilled in the art. According to various aspects, inside an active time, a PDCCH with a dormancy indication field may be configured to include dormancy indication for only the activated SCells. In this case, the indication could be for all of the activated SCells or for a subset of activated SCells, where the subset may be configured by RRC signaling. It is noted that the indication of all activated SCells could be a special case of the more general indication of less than all of the SCells (i.e., the subset indication).

In another option, the indication could be configured to indicate both the activated and deactivated SCells. Here, all of the configured SCells (i.e., all activated and deactivated SCells) could be indicated, or just a subset of the configured SCells could be indicated where the subset can be configured by RRC. In this case, again the option of indicating all the configured SCells may be considered a special case of indicating only a subset of the configured SCells. Of further note, indicating only the active SCells is more efficient in terms of PDCCH overhead due to the field, but this needs more RRC signaling to define the SCell groups due to addition or removal of activated SCells than indicating all configured SCells.

In another option for outside of active time of a DRX cycle, the operations discussed above may be applied to a PDCCH WUS that contains the dormancy indication field. Furthermore, separate options can be applied for a UE inside the active time and outside the active time in a DRX cycle.

Again, it is noted that it is understood that the dormancy indication field only affects the activated SCells even though the dormancy indication field contains bits for the deactivated SCells. Inside an active time, if a PDCCH with a dormancy indication field contains an indication for a deactivated SCell or contains an indication for an SCell group that includes at least one deactivated SCell, the UE may ignore an indication for the deactivated SCell and only apply the indicated dormancy behavior to the activated SCells.

Alternatively, outside of an active time, the operations discussed above may be applied to a PDCCH WUS that contains the dormancy indication field. Separate options can be applied to inside an active time and outside of an active time.

Figure 8:
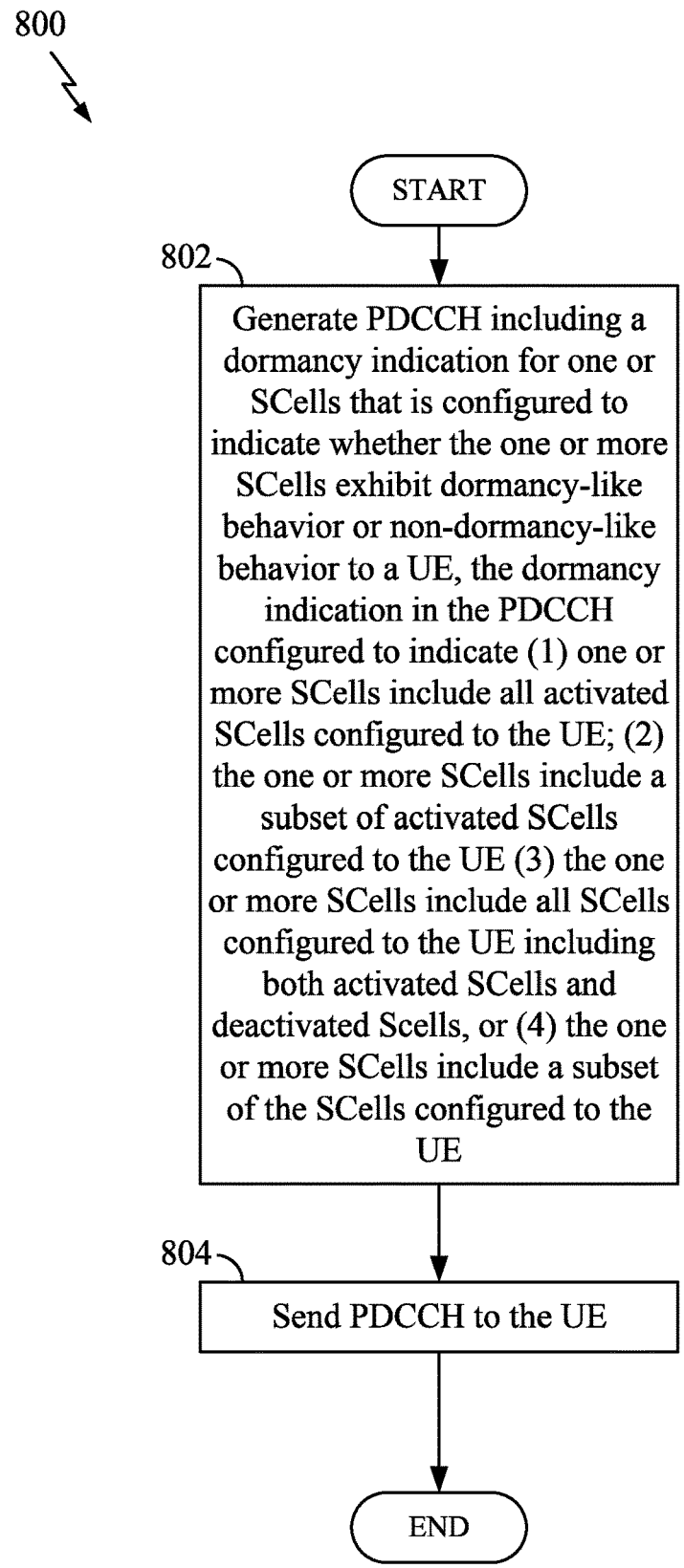
FIG. 8 illustrates a flow diagram of a method for wireless communication in a wireless communication system including dormancy indication for activated and deactivated cells according to certain aspects.

Turning to FIG. 8, this figure illustrates a method 800 for wireless communication in a wireless communication system including dormancy indication for activated and deactivated cells according to certain aspects. Method 800 includes generating a predetermined physical downlink control channel (PDCCH) including a dormancy indication for one or more secondary cells (SCells) that is configured to indicate whether the one or more SCells in the wireless communication system exhibit dormancy-like behavior or non-dormancy-like behavior to a UE as shown in block 802. The processes of block 802 may further include that the dormancy indication in the predetermined PDCCH is further configured to indicate at least one of (1) the one or more SCells include all activated SCells configured to the UE; (2) the one or more SCells include a subset of activated SCells configured to the UE; (3) the one or more SCells include all SCells configured to the UE including both activated SCells and deactivated SCells, or (4) the one or more SCells include a subset of the SCells configured to the UE.

Method 800 may further include sending or transmitting the predetermined PDCCH to the UE as shown in block 804. Furthermore, method 800 may include that the predetermined PDCCH is a PDCCH received during an active time of a DRX cycle for the UE. Moreover, if the predetermined PDCCH includes a dormancy indication field containing indications for at least one or more deactivated SCells or an SCell group including at least one deactivated SCell, method 800 may include that the UE ignores the indication for the at least one or more deactivated SCells and applies indicated dormancy behavior to activated SCells of the one or more SCells.

Still further, method 800 may include that the predetermined PDCCH comprises a PDCCH wake up signal (WUS) received outside of an active time of a DRX cycle for one or more user equipment (UE). If the predetermined PDCCH WUS includes a dormancy indication field containing indications for at least one or more deactivated SCells or an SCell group including at least one deactivated SCell for a UE in the one or more UEs, the UE ignores the indication for the at least one or more deactivated SCells and only applies indicated dormancy behavior to activated SCells of the one or more SCells configured to this UE.

According to further aspects it is noted that the device or apparatus in FIG. 7 may be configured to implement method 800. In aspects, device 700 may be configured to operate in a base station (e.g., scheduling entity 108 or wireless node 310 as two examples) or a UE (e.g., UE 106 or wireless node 320 in FIGS. 1 and 3, respectively) to perform one or more of the operations described above in connection with method 800 illustrated in FIG. 8.

In certain situations where a PDCCH WUS may include a dormancy indication, it may be possible that the dormancy indication is not received by a UE for an SCell indicated in the PDCCH WUS. In such cases, according to aspects of the present disclosure, if a PDCCH WUS that includes an SCell dormancy indication field is not detected by a UE outside the active time before a on duration time period in a DRX cycle, all activated SCells may be at least one of (1) set to a dormancy-like behavior; (2) set to a non-dormancy-like behavior, or (3) the dormancy of the activated SCells may be left unchanged in their respective dormancy behaviors.

In other scenarios, if a UE detects the PDCCH WUS, but the SCell dormancy indication field in a PDCCH WUS does not include a dormancy indication for an activated SCell outside the active time, when the UE enters the DRX on duration time during a next DRX cycle, a number of operations may be predetermined. In a first alternative operation, the activated SCell may be set to a dormancy-like behavior. In another alternative operation, the activated SCell may be set to a non-dormancy-like behavior. In still another alternative operation, the activated SCell dormancy behavior setting may remain unchanged. Additionally it is noted that similar operations may be applied for scenarios where the UE is within an active time than outside the active time, but it is noted the such operations for either inside or outside the active time can be applied independently.

In a scenario where a PDCCH includes SCell dormancy indication field, but the PDCCH is not detected by a UE during or inside an active time, a number of alternative operations could be implemented. In a first alternative operation, all activated SCells may be set to a dormancy-like behavior. In another alternative operation, all activated SCells may be set to a non-dormancy-like behavior. In still another alternative operation, the dormancy behavior settings for all of the activated SCells may remain unchanged.

In a scenario where a PDCCH includes SCell dormancy indication field and the dormancy indication field is detected by a UE during or inside an active time, but the indication field does not include a dormancy indication for an activated SCell, a number of alternative operations could be implemented in this scenario. In a first alternative operation, an activated SCell may be set to a dormancy-like behavior. In another alternative operation, the activated SCell may be set to a non-dormancy-like behavior. In still another alternative operation, the dormancy behavior settings for the activated SCell may remain unchanged.

Again, it is noted that a UE can apply the operations above and the various alternatives independently for time periods inside and outside an active time periods of DRX cycles.

Figure 9:
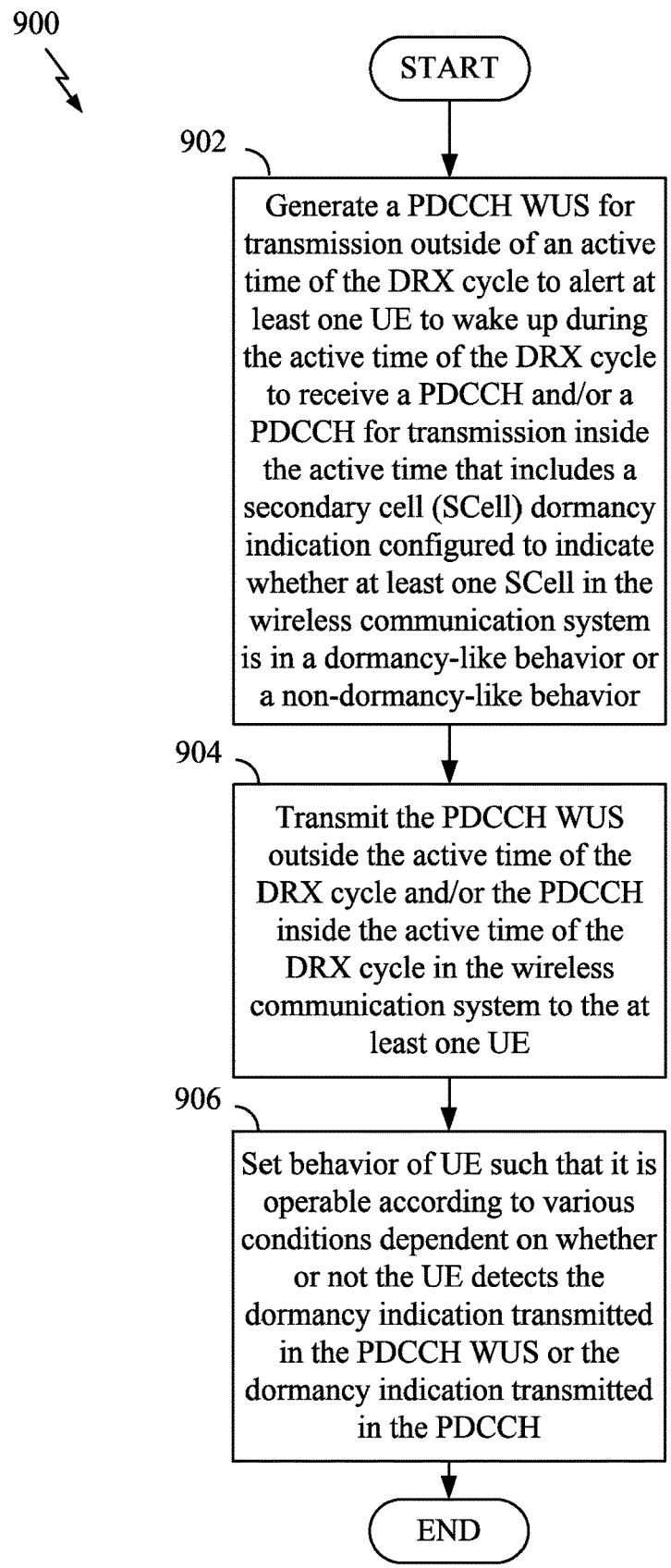
FIG. 9 illustrates a flow diagram of an example method for setting behaviors in a device based on whether or not a dormancy indication is received, either during active times of a DRX cycle or during times outside of a DRX cycle according to certain aspects.

FIG. 9 illustrates a flow diagram of an example method 900 for setting behaviors in a device based on whether or not a dormancy indication is received or detected in the device, either during active times of a DRX cycle or during times outside of a DRX cycle. As shown in FIG. 9, method 900 includes generating a PDCCH WUS for transmission outside of the active time of the DRX cycle to alert at least one user equipment (UE) to wake up during an active time of a DRX cycle (e.g., a next active time after transmission of the PDCCH WUS such as was illustrated in FIG. 5) to receive a PDCCH and/or generate a PDCCH for transmission inside the active time of the DRX cycle, both the PDCCH WUS and PDCCH respectively including a secondary cell (SCell) dormancy indication configured to indicate whether at least one SCell in the wireless communication system is in a dormancy-like behavior or a non-dormancy-like behavior as shown at block 902.

Next, method 900 includes transmitting one of the PDCCH WUS outside the active time of the DRX cycle and/or the PDCCH inside the active time of the DRX cycle in the wireless communication system to the at least one UE as shown at block 904. After transmission of the PDCCH WUS or PDCCH, the behavior of the at least one UE is set such that the UE is operable according to various conditions dependent on whether or not the UE detects the dormancy indication transmitted in the PDCCH WUS or the dormancy indication transmitted in the PDCCH as shown in block 906.

In some aspects, method 900 may further include determining the setting of behavior in the process 906 for activated SCells when a UE fails to detect the PDCCH WUS prior to the next active time including setting all activated SCells to a dormancy-like behavior; setting all activated SCells to a non-dormancy-like behavior; or allowing the dormancy behavior of activated SCells to remain unchanged. According to other aspects, method 900 may include determining the setting of behavior in the process 906 for activated SCells when a UE detects the PDCCH WUS prior to the next active time, but the SCell dormancy indication in the PDCCH WUS does not include an indication for an activated SCell including setting the activated SCell to a dormancy-like behavior, setting the activated SCell to a non-dormancy-like behavior, or allowing the dormancy behavior of the activated SCell to remain unchanged.

According to yet further aspects, method 900 may include determining a setting of behavior in the process 906 for activated SCells when a UE fails to detect a PDCCH inside the active time of the DRX cycle that includes the SCell dormancy indication during the active time of the DRX cycle. In this case the setting of behavior may include one of setting all activated SCells to a dormancy-like behavior, setting all activated SCells to a non-dormancy-like behavior, or allowing the dormancy behavior of activated SCells to remain unchanged. According to yet further aspects, method 900 may include determining a setting of behavior in the process 906 for activated SCells when a UE detects a PDCCH inside the active time of the DRX cycle that includes the SCell dormancy indication during the active time of the DRX cycle. The setting includes one of setting the activated SCell to a dormancy-like behavior, setting the activated SCell to a non-dormancy-like behavior, or allowing the dormancy behavior of the activated SCell to remain unchanged.

Of further note, method 900 may be implemented for setting the behavior of the wireless communication system independent of whether during an active time of a DRX cycle or outside of the active time of the DRX cycle.

According to further aspects it is noted that the device or apparatus in FIG. 7 may be configured to implement method 900. In aspects, device 700 may be configured to operate in a base station (e.g., scheduling entity 108 or wireless node 310 as two examples) or a UE (e.g., UE 106 or wireless node 320 in FIGS. 1 and 3, respectively) to perform one or more of the operations described above in connection with method 900 illustrated in FIG. 9.

In further aspects, methods and apparatus disclosed herein may concern the setting of an application delay for a dormancy indication. Application delay, which is sometimes also called "application time," is the time for the dormancy indication to take effect after a UE receives the indication. When dormancy-like behavior and non-dormancy-like behavior switching is realized or effectuated by bandwidth part (BWP) switching, it is noted that determining the minimum time for the UE to switch to the new BWP based on the dormancy indication that triggers the BWP switch is of concern. According to one aspect, the present methods and apparatus may set the application delay for time periods outside of the active time (i.e., the application delay of the PDCCH WUS dormancy indication that is transmitted outside of the active time) to the maximum of the WUS application delay and the BWP switching time (i.e., BWP switching application delay) supported by the UE. The WUS application delay may be defined here as the time duration from when the PDCCH WUS is received to the instant when the UE is expected to receive PDCCH in the DRX on duration time period.

According to other aspects, during the DRX cycle outside of the active time, the UE may also be configured to not be required to support a WUS application delay that is shorter than the BWP switching time that is supported by the UE. Thus, the minimum time for the WUS application delay would be the BWP switching time supported by the UE.

Figure 10:
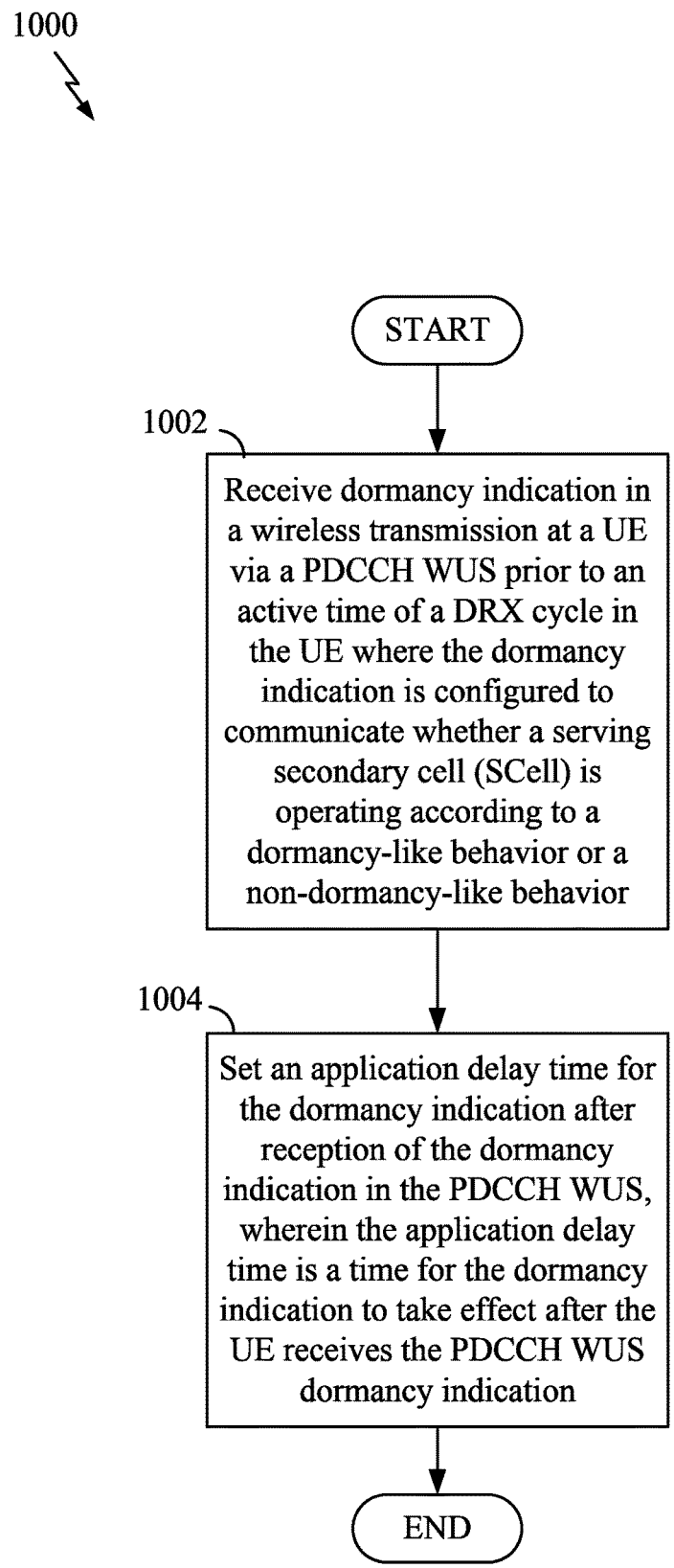
FIG. 10 illustrates a flow diagram of an example method for setting application delay time in wireless communication device according to certain aspects.

FIG. 10 illustrates a flow diagram of a method 1000 for setting application delay time in wireless communication device according to some aspects. Method 1000 includes receiving a dormancy indication in a wireless transmission at a user equipment (UE) via a PDCCH WUS prior to an active time of a DRX cycle in the UE as shown at block 1002. The dormancy indication is configured to communicate whether a serving secondary cell (SCell) is operating according to a dormancy-like behavior or a non-dormancy-like behavior.

Next, method 1000 may include setting an application delay time for the dormancy indication after reception of the dormancy indication in the PDCCH WUS, wherein the application delay time is a time for the dormancy indication to take effect after the UE receives the PDCCH WUS dormancy indication as shown at block 1004.

According to further aspects, method 1000 may include switching between dormancy-like behavior and non-dormancy-like behavior using bandwidth part (BWP) switching wherein dormancy-like behavior and non-dormancy-like behavior are signaled using at least respective first and second BWPs. Further, the method 1000 then includes setting the application delay time to the maximum of the WUS application delay and a BWP switching time supported by the UE where the WUS application delay is a time duration from reception of the PDCCH WUS to the time when the UE is expected to receive the PDCCH within the DRX active time. In yet further alternative aspects, method 1000 may include setting the application delay time such that the UE is not required to support a WUS application delay that is shorter than a BWP switching time that is supported by the UE.

According to further aspects it is noted that the device or apparatus in FIG. 7 may be configured to implement method 1000. In aspects, device 700 may be configured to operate in a base station (e.g., scheduling entity 108 or wireless node 310 as two examples) or a UE (e.g., UE 106 or wireless node 320 in FIGS. 1 and 3, respectively) to perform one or more of the operations described above in connection with method 1000 illustrated in FIG. 10.

Other concerns in a wireless communication system utilizing dormancy indication for SCell dormancy include situation where there is a misalignment or discrepancy between a base station's and a UE's understanding of an SCell's dormancy behavior. For example, a base station may send a PDCCH with dormancy indication that indicates that an SCell will follow a non-dormancy-like behavior. In this scenario, the UE might miss the PDCCH and still be set to consider that the SCell is following a dormancy-like behavior, thus leading to misalignment between the devices' understanding of the SCell dormancy behavior.

In order to try to resolve this misalignment, given the case where a UE follows dormancy-like behavior for an activated SCell and receives a dormancy indication setting the SCell to a dormancy-like behavior, the UE may be configured to assume a same application delay as a regular dormancy switch application delay. It is noted that the regular dormancy switch application delay may be defined as the minimum time required for a UE to switch from dormancy-like behavior to non-dormancy-like behavior, which can also be assumed the same as the time for a UE to switch from non-dormancy-like behavior to dormancy-like behavior. According to another aspect, the UE may be configured to assume a smaller application delay than the regular dormancy switch application delay.

In another scenario when the UE follows a non-dormancy-like behavior for an activated SCell and receives a dormancy indication that sets the SCell to non-dormancy-like behavior, the UE may be configured to assume the same application delay as the regular dormancy switch application delay. Alternatively, the UE may be configured to assume a smaller application delay than the regular dormancy switch application delay.

Figure 11:
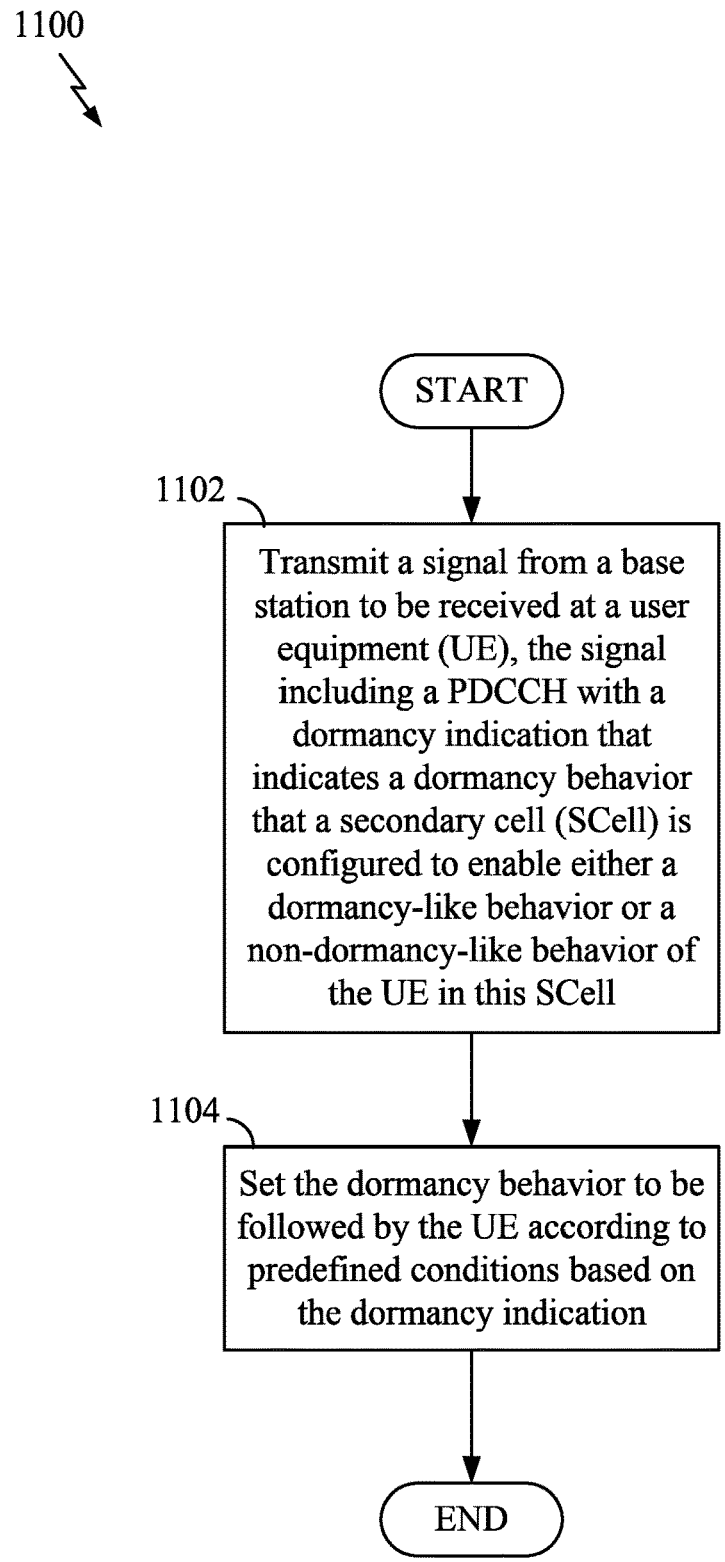
FIG. 11 is a flow diagram of an exemplary method for configuring transmissions in a wireless system according to exemplary aspects of the present disclosure.

FIG. 11 illustrates a flow diagram of a method 1100 for setting behavior of a device in a wireless communication system for situations where there is misalignment of base station and UE understanding of dormancy behaviors according to some aspects. In particular, method 1100 includes transmitting a signal from a base station to be received at a user equipment (UE), the signal including a PDCCH with a dormancy indication that indicates a dormancy behavior that a secondary cell (SCell) is configured to enable either a dormancy-like behavior or a non-dormancy-like behavior of the UE in this SCell as shown in block 1102. Additionally, method 1100 includes setting the dormancy behavior to be followed by the UE according to predefined conditions based on the dormancy indication as shown at block 1104.

In further aspects, the predefined conditions in the processes of block 1104 may include the UE dormancy behavior following a dormancy-like behavior state with respect to an activated SCell and the UE receiving the dormancy indication setting the SCell to a dormancy-like behavior state. In particular, the UE is set to a dormancy behavior including the UE assuming a same application delay as a regular dormancy switch application delay, where the regular dormancy switch application delay is a minimum time required for a UE to switch from a dormancy behavior state to a non-dormancy behavior state, and the application delay is a time for the dormancy indication to take effect after the UE receives the dormancy indication. In an alternative, the UE may be set to a dormancy behavior with the UE assuming a smaller application delay than the regular dormancy switch application delay.

In further aspects, the predefined conditions in the processes of block 1104 may include the UE dormancy behavior following a non-dormancy-like behavior state with respect to an activated SCell and the UE receiving the dormancy indication setting the SCell to a non-dormancy-like behavior state. In particular, the UE is set to a dormancy behavior comprising where the UE assumes a same application delay as a regular dormancy switch application delay, wherein the regular dormancy switch application delay is a minimum time required for a UE to switch from a dormancy-like behavior state to a non-dormancy-like behavior state, and the application delay is a time for the dormancy indication to take effect after the UE receives the dormancy indication. In an alternative aspect, the UE may be set to assume a smaller application delay than the regular dormancy switch application delay.

According to further aspects it is noted that the device or apparatus in FIG. 7 may be configured to implement method 1100. In aspects, device 700 may be configured to operate in a base station (e.g., scheduling entity 108 or wireless node 310 as two examples) or a UE (e.g., UE 106 or wireless node 320 in FIGS. 1 and 3, respectively) to perform one or more of the operations described above in connection with method 1100 illustrated in FIG. 11.

Of further note, the dormancy indications used in either the PDCCH or even the PDCCH WUS may include one or more bit in a bit string. Various proposals can be made concerning how to interpret the dormancy indication bit string, such as what to the different binary states or values of the bits (i.e., 0 or 1 bit values) signify or communicate, and how many SCell's behavior states are being communicated. Accordingly, the present methods and apparatus may include an alternative wherein each bit in the dormancy indication field is used for a group of SCells. In such case one bit value (e.g., "0") may he configured to indicate no change for the dormancy related behavior for activated SCells in the SCell group, whereas the other bit value (e.g., "1") communicates a flip or switch where if activated SCells in the group are following a dormancy-like behavior, for example, the behavior will flip or switch to the other behavior (i.e., a non-dormancy-like behavior), or vice versa.

The present methods and apparatus may include an alternative assuming that each bit in the dormancy indication field being used for a group of SCells where one bit value or state (e.g., "0") may be configured to indicate no change for the dormancy related behavior for activated SCells in the SCell group, whereas the other bit value or state (e.g., "1") communicates that if activated SCells in the group follow a dormancy-like behavior, a change to a non-dormancy-like behavior is instituted in at least one UE.

In yet another alternative in the scenario of bits being used for a group of SCells, one bit value of state (e.g., "0") is used to set activated SCells in the group to a dormancy-like behavior, whereas the other bit value or state (e.g., "1") is used to set activated SCells in the group to a non-dormancy-like behavior. It will be appreciated by those skilled in the art that the meanings of the bit values 0 and 1 may be switched, and the values discussed are not intended to be fixed herein to merely the specific bit value examples above.

According to other examples, each bit in the dormancy indication field may be used for one SCell (e.g., per SCell). In one example, if a bit in the indication field is set to a first bit value (e.g., "0") may be used to indicate no change where the dormancy related behavior will not be changed for the particular SCell, whereas if the bit is the other binary bit value (e.g., "1"), this communicates a flip or switch where if the particular activated SCell is following a dormancy-like behavior, for example, the behavior will flip or switch to the other behavior (i.e., a non-dormancy-like behavior), or vice versa.

Further, the present methods and apparatus may include an alternative assuming that each bit in the dormancy indication field is used for a particular SCell where one bit value or state (e.g., "0") may be configured to indicate no change for the dormancy related behavior for the particular activated SCell, whereas the other bit value or state (e.g., "1") communicates that if the particular activated SCell follows a dormancy-like behavior, a change is made to a non-dormancy-like behavior.

In yet another alternative in the scenario of bits being used for a particular SCell, one bit value of state (e.g., "0") is used to set the activated SCell to a dormancy-like behavior, whereas the other bit value or state (e.g., "1") is used to set the activated SCell to a non-dormancy-like behavior. It will again be appreciated by those skilled in the art that the meanings of the bit values 0 and 1 may be switched, and the values discussed are not intended to be fixed herein to merely the specific bit value examples above.

In yet further aspects of setting or determining bit values in the dormancy indication, a combination of 0/1 values of all bits in the bit string or a combination of 0/1 values in just a subset of bits in the bit-string can be used to provide the dormancy indication for SCells in 5G NR specified frequency ranges FR1 and FR2, where FR1 and FR2 are generally frequency ranges for sub-6GHz frequency bands and millimeter wave bands, respectively. In this aspect, certain combinations of the 0/1 bit values can be used to indicate various conditions such as (1) activated SCells in FR1 are set to dormancy-like behavior, (2) activated SCells in FR1 are set to non-dormancy-like behavior, (3) activated SCells in FR1 do not change their dormancy related behavior, (4) activated SCells in FR1 flip their dormancy related behavior, (5) activated SCells in FR2 are set to dormancy-like behavior, (6) activated SCells in FR2 are set to non-dormancy-like behavior, (7) activated SCells in FR2 do not change their dormancy related behavior, or (8) activated SCells in FR2 flip their dormancy related behavior.

In still further aspects, it is noted that PDCCH WUS may be used for a group of UEs, and therefore it may be preferable to at least have a "no change" function included in the dormancy indication of a PDCCH WUS. As the PDCCH inside an active time of a UE DRX cycle is UE specific, more flexibility can be provided by the dormancy indication in the PDCCH WUS. Accordingly, in some example for a PDCCH WUS that includes a dormancy indication field outside of the active time, a subset of bits, which may be at least 2 bits but not limited thereto, of a bit string to indicate dormancy of a SCell group may indicate operation in at least the following behaviors: (1) activated SCells in the group do not change their dormancy related behavior; (2) activated SCells in the group are set to dormancy-like behavior; or (3) activated SCells in the group are set to non-dormancy-like behavior.

In yet another alternative, where a PDCCH includes a dormancy indication field inside the active time of may use subset (e.g., at least 1 bit) of the bit string to indicate dormancy of a SCell group or an SCell to operate in at least the following behaviors: (1) activated SCells in the group or the activated SCell are/is set to dormancy-like behavior; or (2) activated SCells in the group or the activated SCell are/is set to non-dormancy-like behavior.

Figure 12:
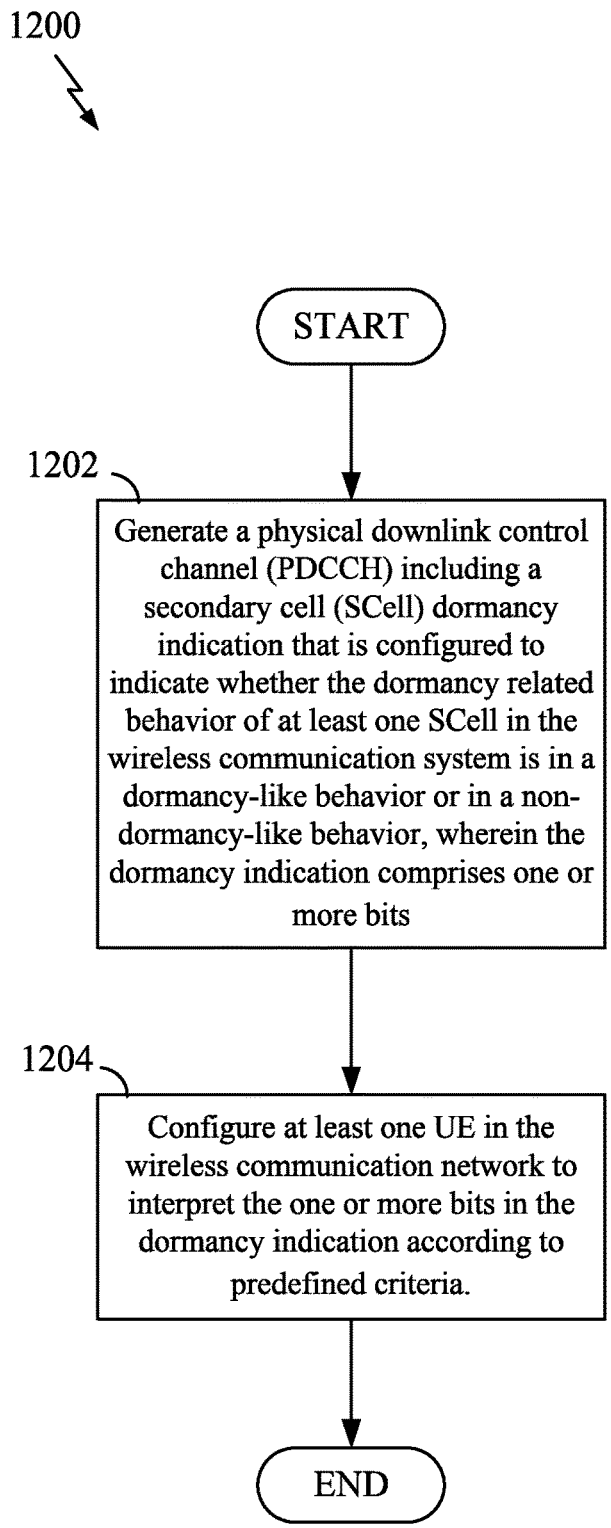
FIG. 12 is another flow diagram of an exemplary method for wireless communication in a wireless communication including interpretation/setting of bit in a dormancy indication according to some aspects.

FIG. 12 illustrates a method 1200 for wireless communication in a wireless communication including interpretation/setting of bit in a dormancy indication according to some aspects. As shown, method 1200 includes generating a physical downlink control channel (PDCCH) including a secondary cell (SCell) dormancy indication that is configured to indicate whether the dormancy related behavior of at least one SCell in the wireless communication system is in a dormancy-like behavior or in a non-dormancy-like behavior, wherein the dormancy indication comprises one or more bits as shown in block 1202. Furthermore, method 1200 includes configuring at least one UE in the wireless communication network to interpret the one or more bits in the dormancy indication according to predefined criteria as shown in block 1204.

Method 1200 may further include at least one bit of the one or more bits in the dormancy indication is used for indicating the dormancy related behavior of a group of SCells. Additionally, the predefined criteria may include the at least one bit having a first binary value predefined to indicate that the dormancy related behavior is not changed for activated SCells in the group of SCells and a second binary value predefined to indicate a switch in the dormancy related behavior for activated SCells of the group of SCells.

In another aspect, method 1200 may include at least one bit of the one or more bits in the dormancy indication is used for indicating the dormancy related behavior of a group of SCells, and the predefined criteria including the at least one bit having a first binary value predefined to indicate that the dormancy behavior is not changed for activated SCells in the group of SCells and a second binary value predefined to indicate a change the dormancy related behavior to non-dormancy-like behavior for activated SCells of the group of SCells if the activated SCells currently follow dormancy-like behavior.

In still another aspect, method 1200 may include at least one bit of the one or more bits in the dormancy indication is used for indicating the dormancy related behavior of a group of SCells, and the predefined criteria including the at least one bit having a first binary value predefined to indicate setting activated SCells in the group of SCells to dormancy-like behavior and a second binary value predefined to indicate setting the activated SCells of the group of SCells to non-dormancy-like behavior.

In yet another aspect, method 1200 may include at least one bit of the one or more bits in the dormancy indication is used for indicating the dormancy related behavior of the at least one SCell, and the predefined criteria including the at least one bit having a first binary value predefined to indicate that the dormancy related behavior is not changed for the at least one SCell when activated and a second binary value predefined to indicate a switch in the dormancy related behavior for the activated at least one SCell.

According to still further aspects, method 1200 may include at least one bit of the one or more bits in the dormancy indication is used for indicating the dormancy related behavior of the at least one SCell, Further, the predefined criteria include the at least one bit having a first binary value predefined to indicate that the dormancy related behavior is not changed for the at least one SCell when activated and a second binary value predefined to indicate a change the dormancy related behavior to non-dormancy-like behavior for the activated at least one SCell if the activated at least one SCell currently follows dormancy-like behavior.

In another aspect, method 1200 may include at least one bit of the one or more bits in the dormancy indication is used for indicating the dormancy related behavior of the at least one SCell, and the predefined criteria including the at least one bit having a first binary value predefined to indicate setting the at least one SCell when activated to dormancy-like behavior and a second binary value predefined to indicate setting the activated at least one SCell to non-dormancy-like behavior.

In yet another aspect, method 1200 may include utilizing a combination of bits having zero and one values in the dormancy indication that are configured to indicate the dormancy related behavior for the at least one SCell when operating according to one of multiple frequency ranges. The multiple frequency ranges include first frequency range FR1 defined according to 3GPP new radio (NR) and frequency range FR2 defined according to 3GPP NR. Moreover, the combination of bits is configured to indicate one more of the following: activated SCells in FR1 set to dormancy-like behavior; activated SCells in FR1 set to non-dormancy-like behavior; activated SCells in FRI not changing dormancy related behavior; activated SCells in FR1 switch to the other dormancy related behavior; activated SCells in FR2 set to dormancy-like behavior; activated SCells in FR2 set to non-dormancy-like behavior; activated SCells in FR2 not changing dormancy related behavior; or activated SCells in FR2 switch to the other dormancy related behavior.

In still other aspects, method 1200 may include generating a physical downlink control channel wake up signal (PDCCH WUS) configured to signal the at least one user equipment (UE), wherein the PDCCH WUS is configured for transmission outside of an active time of a DRX cycle of the at least one UE, and is configured to include a plurality of bits indicating a secondary cell (SCell) dormancy indication that indicates at least that no change will occur in a dormancy behavior of the SCell. Additionally, method 1200 includes transmitting the PDCCH WUS to the at least one UE during a time outside of an active time of the DRX cycle of the at least one UE. Moreover, the plurality of bits of the SCell dormancy indication in the PDCCH WUS may be configured to indicate that a group of SCells will operate according to at least one of: activated SCells in the group of SCells will not change their dormancy related behavior; activated SCells in the group of SCells are set to a dormancy-like behavior; or activated SCells in the group of SCells are set to a non-dormancy-like behavior.

In yet one more aspect, method 1200 may include at least one bit of the one or more bits in the dormancy indication is used for indicating the dormancy related behavior of a group of activated SCells or an activated SCell during an active time of a DRX cycle for at least one UE. Here, the at least one bit indicates one of the following: activated SCells in the group of SCells or the activated SCell are set to a dormancy-like behavior, or activated SCells in the group of SCells or the activated SCell are set to a non-dormancy-like behavior.

It is further noted here that all of the various methods and apparatus disclosed herein for providing a dormancy indication inside an active time when DRX is configured may also be applied to a UE in a connected mode when DRX is not configured. That is, the PDCCH in active times applies to a UE when DRX is not configured, whereas PDCCH WUS is defined only for UE DRX and does not apply to a UE when DRX is not configured.

Figure 13:
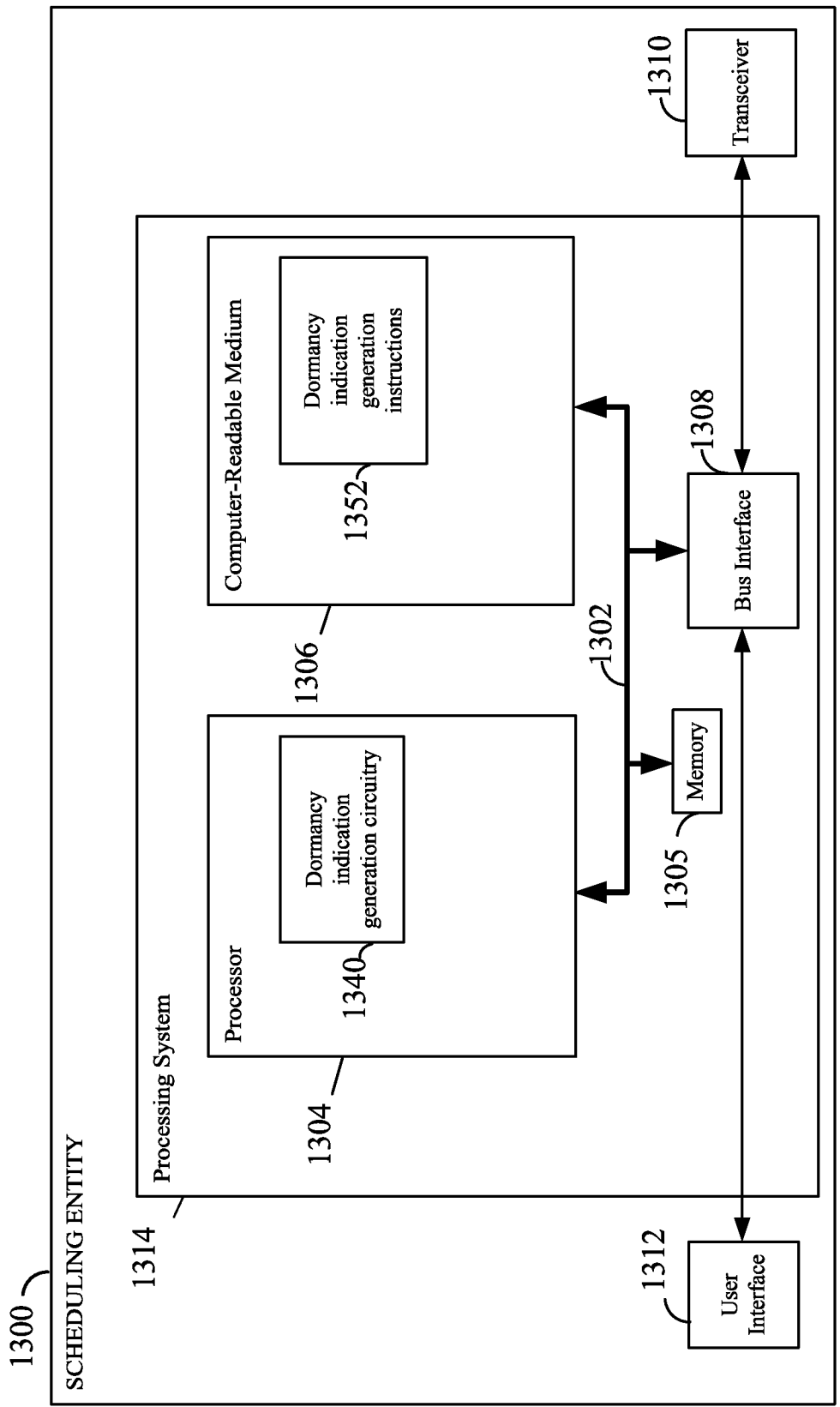
FIG. 13 is a block diagram illustrating an example of a hardware implementation for a scheduling entity apparatus employing a processing system.

FIG. 13 is a block diagram illustrating an example of a hardware implementation for a scheduling entity 1300 employing a processing system 1314. For example, the scheduling entity 1300 may be a base station as illustrated in any one or more of FIGS. 1-3, but also could be a user equipment (UE) as also illustrated in any one or more of FIGS. 1-3. The scheduling entity 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1300 may be configured to perform any one or more of the functions described herein. That is, the processor 1304, as utilized in a scheduling entity 1300, may be used to implement any one or more of the processes and procedures described below and illustrated in the flow diagram of FIG. 11, to be discussed later.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided.

In some aspects of the disclosure, the processor 1304 may include dormancy indication generation circuitry 1340 configured for effecting various functions, including, for example, any of the methods described above in connection with FIGS. 5-12. The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1306 may include dormancy indication generation software or instructions 1352 configured for various functions, including any of the methods described above in connection with FIGS. 5-12

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIG. 1, 2, or 3, and utilizing, for example, the processes and/or algorithms described herein in relation to FIGS. 5-12.

Figure 14:
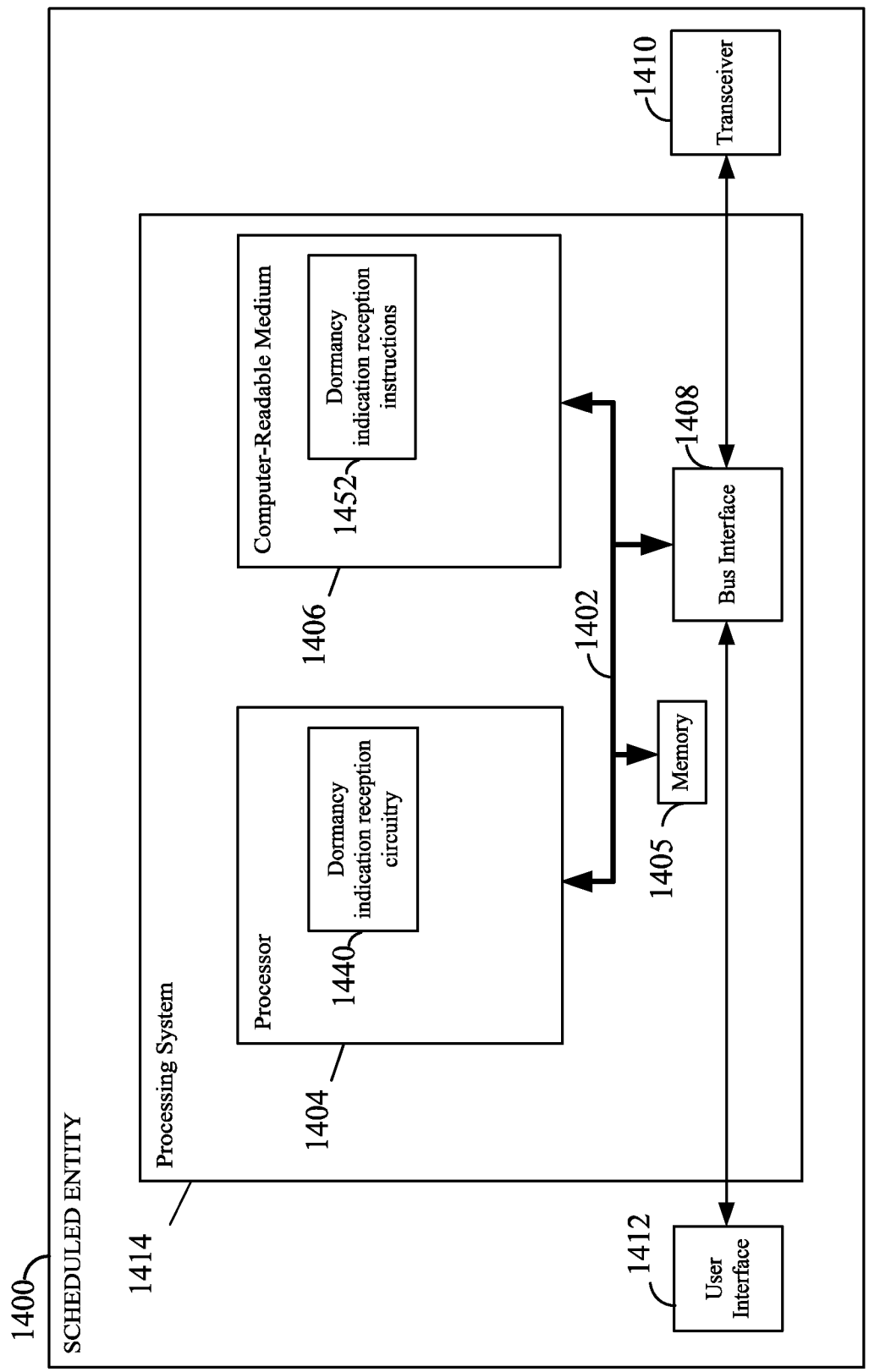
FIG. 14 is a block diagram illustrating an example of a hardware implementation for a scheduled entity apparatus employing a processing system.

FIG. 14 is a conceptual diagram illustrating an example of a hardware implementation for an exemplary scheduled entity 1400 employing a processing system 1414. In accordance with various aspects of the disclosure, an element, or any portion of an element, or any combination of elements may be implemented with a processing system 1414 that includes one or more processors 1404. For example, the scheduled entity 1400 may be a user equipment (UE) as illustrated in any one or more of FIGS. 1-3.

The processing system 1414 may be substantially the same as the processing system 1314 illustrated in FIG. 13, including a bus interface 1408, a bus 1402, memory 1405, a processor 1404, and a computer-readable medium 1406. Furthermore, the scheduled entity 1400 may include a user interface 1412 and a transceiver 1410 substantially similar to those described above in FIG. 14. That is, the processor 1404, as utilized in a scheduled entity 1400, may be used to implement any one or more of the processes described above and illustrated in FIGS. 5-12.

In some aspects of the disclosure, the processor 1404 may include a dormancy indication reception circuit or circuitry 1440 configured for various functions, including, for example, the method and functions described above in connection with FIGS. 5-12. Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIG. 1, 2, or 3, and utilizing, for example, the processes and/or algorithms described herein in relation to FIGS. 5-12. Instructions or software corresponding to the circuits or circuitry 1440 includes dormancy indication reception instructions 1454, which are configured to cause the processor 1304 to effectuate any of the methods and processes disclosed herein with respect to FIGS. 5-12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication in a wireless communication system, the method comprising:
transmitting a physical downlink control channel (PDCCH) including a secondary cell (SCell) dormancy indication that is configured to indicate whether a dormancy related behavior of at least one SCell in the wireless communication system is in a dormancy-like behavior or in a non-dormancy-like behavior, wherein:
the SCell dormancy indication comprises one or more bits, and
at least one bit of the one or more bits in the SCell dormancy indication is used for indicating the dormancy related behavior of a group of SCells; and
configuring at least one user equipment (UE) in the wireless communication system to interpret the one or more bits in the SCell dormancy indication according to predefined criteria, wherein the predefined criteria include:
the at least one bit having a first binary value predefined to indicate setting activated SCells in the group of SCells to the dormancy-like behavior and a second binary value predefined to indicate setting the activated SCells in the group of SCells to the non-dormancy-like behavior.

2. The method of claim 1, wherein a combination of bits in the SCell dormancy indication or a combination of a subset of bits in the SCell dormancy indication are configured to indicate the dormancy related behavior for the at least one SCell when operating according to one of multiple frequency ranges.

3. The method of claim 2, wherein the multiple frequency ranges include first frequency range FR1 defined according to 3GPP new radio (NR) and second frequency range FR2 defined according to 3GPP NR.

4. The method of claim 3, wherein the combination of bits is configured to indicate at least one of:
the activated SCells in FR1 set to the dormancy-like behavior,
the activated SCells in FR1 set to the non-dormancy-like behavior,
the activated SCells in FR1 not changing the dormancy related behavior,
the activated SCells in FR1 switch to an other dormancy related behavior,
the activated SCells in FR2 set to the dormancy-like behavior,
the activated SCells in FR2 set to the non-dormancy-like behavior,
the activated SCells in FR2 not changing the dormancy related behavior, or
the activated SCells in FR2 switch to the other dormancy related behavior.

5. The method of claim 1, further comprising:
generating a physical downlink control channel wake up signal (PDCCH WUS) configured to signal the at least one UE, wherein the PDCCH WUS is configured for transmission outside of an active time of a discontinuous reception (DRX) cycle of the at least one UE, and is configured to include a plurality of bits indicating that the SCell dormancy indication indicates at least that no change will occur in the dormancy related behavior of the at least one SCell; and
transmitting the PDCCH WUS to the at least one UE during a time outside of the active time of the DRX cycle of the at least one UE.

6. The method of claim 5, wherein the plurality of bits of the SCell dormancy indication in the PDCCH WUS are configured to indicate that the group of SCells will operate according to at least one of:

the activated SCells in the group of SCells will not change their dormancy related behavior,
the activated SCells in the group of SCells are set to the dormancy-like behavior, or
the activated SCells in the group of SCells are set to the non-dormancy-like behavior.

7. The method of claim 1, wherein the SCell dormancy indication in the PDCCH in an active time in a discontinuous reception (DRX) cycle when DRX is configured indicates dormancy to the at least one UE in a connected mode when DRX is not configured for the at least one UE.

8. A method for wireless communication in a wireless communication system, the method comprising:
transmitting a physical downlink control channel (PDCCH) including a secondary cell (SCell) dormancy indication that is configured to indicate whether a dormancy related behavior of at least one SCell in the wireless communication system is in a dormancy-like behavior or in a non-dormancy-like behavior, wherein:
the SCell dormancy indication comprises one or more bits, and
at least one bit of the one or more bits in the SCell dormancy indication is used for indicating the dormancy related behavior of a group of SCells; and
configuring at least one user equipment (UE) in the wireless communication system to interpret the one or more bits in the SCell dormancy indication according to predefined criteria, wherein the predefined criteria include at least one of:
the at least one bit having a first binary value predefined to indicate that the dormancy related behavior is not changed for activated SCells in the group of SCells and a second binary value predefined to indicate a switch in the dormancy related behavior for the activated SCells in the group of SCells, or
the at least one bit having the first binary value predefined to indicate that the dormancy related behavior is not changed for the activated SCells in the group of SCells and the second binary value predefined to indicate a change of the dormancy related behavior to the non-dormancy-like behavior for the activated SCells in the group of SCells if the activated SCells currently follow the dormancy-like behavior.

9. The method of claim 8, wherein a combination of bits in the SCell dormancy indication or a combination of a subset of bits in the SCell dormancy indication are configured to indicate the dormancy related behavior for the at least one SCell when operating according to one of multiple frequency ranges.

10. The method of claim 9, wherein the multiple frequency ranges include first frequency range FR1 defined according to 3GPP new radio (NR) and second frequency range FR2 defined according to 3GPP NR.

11. The method of claim 10, wherein the combination of bits is configured to indicate at least one of:
the activated SCells in FR1 set to the dormancy-like behavior,
the activated SCells in FR1 set to the non-dormancy-like behavior,
the activated SCells in FR1 not changing the dormancy related behavior,
the activated SCells in FR1 switch to an other dormancy related behavior,
the activated SCells in FR2 set to the dormancy-like behavior,
the activated SCells in FR2 set to the non-dormancy-like behavior,
the activated SCells in FR2 not changing the dormancy related behavior, or
the activated SCells in FR2 switch to the other dormancy related behavior.

12. The method of claim 8, further comprising:
generating a physical downlink control channel wake up signal (PDCCH WUS) configured to signal the at least one UE, wherein the PDCCH WUS is configured for transmission outside of an active time of a discontinuous reception (DRX) cycle of the at least one UE, and is configured to include a plurality of bits indicating that the SCell dormancy indication indicates at least that no change will occur in the dormancy related behavior of the at least one SCell; and
transmitting the PDCCH WUS to the at least one UE during a time outside of the active time of the DRX cycle of the at least one UE.

13. The method of claim 12, wherein the plurality of bits of the SCell dormancy indication in the PDCCH WUS are configured to indicate that the group of SCells will operate according to at least one of:
the activated SCells in the group of SCells will not change their dormancy related behavior,
the activated SCells in the group of SCells are set to the dormancy-like behavior, or
the activated SCells in the group of SCells are set to the non-dormancy-like behavior.

14. The method of claim 8, wherein the SCell dormancy indication in the PDCCH in an active time in a discontinuous reception (DRX) cycle when DRX is configured indicates dormancy to the at least one UE in a connected mode when DRX is not configured for the at least one UE.

15. A method for wireless communication in a wireless communication system, the method comprising:
transmitting a physical downlink control channel (PDCCH) including a secondary cell (SCell) dormancy indication that is configured to indicate whether a dormancy related behavior of at least one SCell in the wireless communication system is in a dormancy-like behavior or in a non-dormancy-like behavior, wherein:
the SCell dormancy indication comprises one or more bits, and
at least one bit of the one or more bits in the SCell dormancy indication is used for indicating the dormancy related behavior of the at least one SCell; and
configuring at least one user equipment (UE) in the wireless communication system to interpret the one or more bits in the SCell dormancy indication according to predefined criteria, wherein the predefined criteria include at least one of:
the at least one bit having a first binary value predefined to indicate that the dormancy related behavior is not changed for the at least one SCell when activated and a second binary value predefined to indicate a switch in the dormancy related behavior for the at least one SCell when activated, or
the at least one bit having the first binary value predefined to indicate that the dormancy related behavior is not changed for the at least one SCell when activated and the second binary value predefined to indicate a change the dormancy related behavior to the non-dormancy-like behavior for the at least one SCell when activated if the at least one SCell currently follows the dormancy-like behavior.

16. The method of claim 15, wherein a combination of bits in the SCell dormancy indication or a combination of a subset of bits in the SCell dormancy indication are configured to indicate the dormancy related behavior for the at least one SCell when operating according to one of multiple frequency ranges.

17. The method of claim 16, wherein the multiple frequency ranges include first frequency range FR1 defined according to 3GPP new radio (NR) and second frequency range FR2 defined according to 3GPP NR.

18. The method of claim 17, wherein the combination of bits is configured to indicate at least one of:
   activated SCells in FR1 set to the dormancy-like behavior,
   activated SCells in FR1 set to the non-dormancy-like behavior,
   activated SCells in FR1 not changing the dormancy related behavior,
   activated SCells in FR1 switch to an other dormancy related behavior,
   activated SCells in FR2 set to the dormancy-like behavior,
   activated SCells in FR2 set to the non-dormancy-like behavior,
   activated SCells in FR2 not changing the dormancy related behavior, or
   activated SCells in FR2 switch to the other dormancy related behavior.

19. The method of claim 15, further comprising:
   generating a physical downlink control channel wake up signal (PDCCH WUS) configured to signal the at least one UE, wherein the PDCCH WUS is configured for transmission outside of an active time of a discontinuous reception (DRX) cycle of the at least one UE, and is configured to include a plurality of bits indicating that the SCell dormancy indication indicates at least that no change will occur in the dormancy related behavior of the at least one SCell; and
   transmitting the PDCCH WUS to the at least one UE during a time outside of the active time of the DRX cycle of the at least one UE.

20. The method of claim 19, wherein the plurality of bits of the SCell dormancy indication in the PDCCH WUS are configured to indicate that a group of SCells will operate according to at least one of:
   activated SCells in the group of SCells will not change their dormancy related behavior,
   activated SCells in the group of SCells are set to the dormancy-like behavior, or
   activated SCells in the group of SCells are set to the non-dormancy-like behavior.

21. The method of claim 15, wherein the SCell dormancy indication in the PDCCH in an active time in a discontinuous reception (DRX) cycle when DRX is configured indicates dormancy to the at least one UE in a connected mode when DRX is not configured for the at least one UE.

22. A method for wireless communication in a wireless communication system, the method comprising:
   transmitting a physical downlink control channel (PDCCH) including a secondary cell (SCell) dormancy indication that is configured to indicate whether a dormancy related behavior of at least one SCell in the wireless communication system is in a dormancy-like behavior or in a non-dormancy-like behavior, wherein:
   the SCell dormancy indication comprises one or more bits, and
   at least one bit of the one or more bits in the SCell dormancy indication is used for indicating the dormancy related behavior of the at least one SCell; and
   configuring at least one user equipment (UE) in the wireless communication system to interpret the one or more bits in the SCell dormancy indication according to predefined criteria, wherein the predefined criteria include:
   the at least one bit having a first binary value predefined to indicate setting the at least one SCell when activated to the dormancy-like behavior and a second binary value predefined to indicate setting the at least one SCell when activated to the non-dormancy-like behavior.

23. The method of claim 22, wherein a combination of bits in the SCell dormancy indication or a combination of a subset of bits in the SCell dormancy indication are configured to indicate the dormancy related behavior for the at least one SCell when operating according to one of multiple frequency ranges.

24. The method of claim 23, wherein the multiple frequency ranges include first frequency range FR1 defined according to 3GPP new radio (NR) and second frequency range FR2 defined according to 3GPP NR.

25. The method of claim 24, wherein the combination of bits is configured to indicate at least one of:
   activated SCells in FR1 set to the dormancy-like behavior,
   activated SCells in FR1 set to the non-dormancy-like behavior,
   activated SCells in FR1 not changing the dormancy related behavior,
   activated SCells in FR1 switch to an other dormancy related behavior,
   activated SCells in FR2 set to the dormancy-like behavior,
   activated SCells in FR2 set to the non-dormancy-like behavior,
   activated SCells in FR2 not changing the dormancy related behavior, or
   activated SCells in FR2 switch to the other dormancy related behavior.

26. The method of claim 22, further comprising:
   generating a physical downlink control channel wake up signal (PDCCH WUS) configured to signal the at least one UE, wherein the PDCCH WUS is configured for transmission outside of an active time of a discontinuous reception (DRX) cycle of the at least one UE, and is configured to include a plurality of bits indicating that the SCell dormancy indication indicates at least that no change will occur in the dormancy related behavior of the at least one SCell; and
   transmitting the PDCCH WUS to the at least one UE during a time outside of the active time of the DRX cycle of the at least one UE.

27. The method of claim 26, wherein the plurality of bits of the SCell dormancy indication in the PDCCH WUS are configured to indicate that a group of SCells will operate according to at least one of:
   activated SCells in the group of SCells will not change their dormancy related behavior,
   activated SCells in the group of SCells are set to the dormancy-like behavior, or
   activated SCells in the group of SCells are set to the non-dormancy-like behavior.

28. The method of claim 22, wherein the SCell dormancy indication in the PDCCH in an active time in a discontinuous reception (DRX) cycle when DRX is configured indicates dormancy to the at least one UE in a connected mode when DRX is not configured for the at least one UE.

29. A method for wireless communication in a wireless communication system, the method comprising:

transmitting a physical downlink control channel (PDCCH) including a secondary cell (SCell) dormancy indication that is configured to indicate whether a dormancy related behavior of at least one SCell in the wireless communication system is in a dormancy-like behavior or in a non-dormancy-like behavior, wherein:
the SCell dormancy indication comprises one or more bits, and
at least one bit of the one or more bits in the SCell dormancy indication is used for indicating the dormancy related behavior of a group of activated SCells or an activated SCell during an active time of a discontinuous reception (DRX) cycle for the at least one UE; and
configuring at least one user equipment (UE) in the wireless communication system to interpret the one or more bits in the SCell dormancy indication according to predefined criteria, wherein the at least one bit indicates at least one of:
SCells in the group of activated SCells or the activated SCell are set to the dormancy-like behavior, or
SCells in the group of activated SCells or the activated SCell are set to the non-dormancy-like behavior.

30. The method of claim 29, wherein a combination of bits in the SCell dormancy indication or a combination of a subset of bits in the SCell dormancy indication are configured to indicate the dormancy related behavior for the at least one SCell when operating according to one of multiple frequency ranges.

31. The method of claim 30, wherein the multiple frequency ranges include first frequency range FR1 defined according to 3GPP new radio (NR) and second frequency range FR2 defined according to 3GPP NR.

32. The method of claim 31, wherein the combination of bits is configured to indicate at least one of:
activated SCells in FR1 set to the dormancy-like behavior,
activated SCells in FR1 set to the non-dormancy-like behavior,
activated SCells in FR1 not changing the dormancy related behavior,
activated SCells in FR1 switch to an other dormancy related behavior,
activated SCells in FR2 set to the dormancy-like behavior,
activated SCells in FR2 set to the non-dormancy-like behavior,
activated SCells in FR2 not changing the dormancy related behavior, or
activated SCells in FR2 switch to the other dormancy related behavior.

33. The method of claim 29, further comprising:
generating a physical downlink control channel wake up signal (PDCCH WUS) configured to signal the at least one UE, wherein the PDCCH WUS is configured for transmission outside of the active time of the DRX cycle of the at least one UE, and is configured to include a plurality of bits indicating that the SCell dormancy indication indicates at least that no change will occur in the dormancy related behavior of the at least one SCell; and
transmitting the PDCCH WUS to the at least one UE during a time outside of the active time of the DRX cycle of the at least one UE.

34. The method of claim 33, wherein the plurality of bits of the SCell dormancy indication in the PDCCH WUS are configured to indicate that a group of SCells will operate according to at least one of:
activated SCells in the group of SCells will not change their dormancy related behavior,
activated SCells in the group of SCells are set to the dormancy-like behavior, or
activated SCells in the group of SCells are set to the non-dormancy-like behavior.

35. The method of claim 29, wherein the SCell dormancy indication in the PDCCH in the active time in the DRX cycle when DRX is configured indicates dormancy to the at least one UE in a connected mode when DRX is not configured for the at least one UE.

* * * * *